(12) United States Patent
Wang et al.

(10) Patent No.: US 11,893,179 B2
(45) Date of Patent: Feb. 6, 2024

(54) TOUCH DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ji Wang, Beijing (CN); Hengzhen Liang, Beijing (CN); Lianbin Liu, Beijing (CN); Fan Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/922,536

(22) PCT Filed: Nov. 5, 2021

(86) PCT No.: PCT/CN2021/129080
§ 371 (c)(1),
(2) Date: Oct. 31, 2022

(87) PCT Pub. No.: WO2022/142736
PCT Pub. Date: Jul. 7, 2022

(65) Prior Publication Data
US 2023/0214046 A1 Jul. 6, 2023

(30) Foreign Application Priority Data

Dec. 30, 2020 (CN) .......................... 202011631557.7
Mar. 10, 2021 (CN) .......................... 202110261099.0

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 2203/04107* (2013.01)

(58) Field of Classification Search
CPC .. G06F 3/04164; G06F 3/0412; G06F 3/0446; G06F 2203/04107;
(Continued)

(56) References Cited

U.S. PATENT DOCUMENTS

2021/0185813 A1* 6/2021 Huang ................... H05K 1/118
2021/0333590 A1* 10/2021 Ma ....................... G02F 1/13452
2022/0256706 A1* 8/2022 Xiong ................. G06F 3/04164

* cited by examiner

*Primary Examiner* — Temesghen Ghebretinsae
*Assistant Examiner* — Ivelisse Martinez Quiles
(74) *Attorney, Agent, or Firm* — IP & T GROUP LLP

(57) ABSTRACT

A touch display device, relating to the technical field of display, and capable of reducing interference between signals and reducing production costs. The touch display device comprises a touch display module, a flexible printed board, and a touch chip. The flexible printed board is electrically connected to the touch display module, and comprises a first flexible substrate, a first metal pattern layer, a second metal pattern layer, and a metal shielding layer. The first metal pattern layer comprises a plurality of first touch wires. The second metal pattern layer comprises a plurality of data wires. The metal shielding layer is located between the first flexible substrate and the first metal pattern layer. A ratio of the longitudinal length of the metal shielding layer to the longitudinal length of the flexible printed board ranges from 20% to 40%. A vertical projection of the first metal pattern layer on the first flexible substrate and a vertical projection of the second metal pattern layer on the first flexible substrate have an overlapping region; and a vertical projection of the metal shielding layer on the first flexible substrate at (Continued)

least covers the overlapping region. The width of the first touch wires is greater than the width of the electrode leads.

20 Claims, 21 Drawing Sheets

(58) Field of Classification Search
CPC .......... G06F 2203/04103; G06F 3/041; G06F 3/044; G06F 3/0443; G06F 3/0445
See application file for complete search history.

TOUCH DISPLAY DEVICE

CROSS-REFERENCE TO RELATED APPLICATIONS

This application is a national phase entry under 35 USC 371 of International Patent Application No. PCT/CN 2021/129080 filed on Nov. 5, 2021, which claims priority to Chinese Patent Application No. 202011631557.7, filed with the China Patent Office on Dec. 30, 2020, and Chinese Patent Application No. 202110261099.0, filed with the China Patent Office on Mar. 10, 2021, which are incorporated herein by reference in their entirety.

TECHNICAL FIELD

The present disclosure relates to the field of display technologies, and in particular, to a touch display device.

BACKGROUND

With the development of display technologies, display devices with a touch display integrated (also referred to as flexible multi-layer on cell, FMLOC) structure gradually enter the market. An FMLOC display device includes a touch device, a display device and a flexible printed circuit (FPC). The FPC is electrically connected to the touch device and the display device, so as to transmit signals between the FPC and the touch device and transmit signals between the FPC and the display device, thereby realizing image display.

In order to realize the control of both touch and display, at present, an FPC made of a multilayer board is usually used to be electrically connected to control mainboards of the touch device and the display device. However, existing FPCs each made of a multilayer board have the technical problems of high manufacturing difficulty and high costs.

SUMMARY

In an aspect, a touch display device is provided. The touch display device includes a touch display module, a flexible printed circuit and a touch chip. The touch display module includes a display screen and a touch panel. A display driving circuit is disposed on the display screen, and a plurality of electrode leads are disposed in a peripheral area of the touch panel. The touch chip is disposed on the flexible printed circuit. The flexible printed circuit is electrically connected to the touch display module. The flexible printed circuit has a body area and a connection area located on a side of the body area. The flexible printed circuit includes a first flexible substrate, a first metal pattern layer, a second metal pattern layer and a metal shielding layer. The first flexible substrate includes a first surface and a second surface arranged opposite to each other. The first metal pattern layer is located on a side of the first flexible substrate where the first surface is located. The first metal pattern layer includes a plurality of first touch wirings electrically connected to the touch chip. The second metal pattern layer is located on the second surface of the first flexible substrate. The second metal pattern layer includes a plurality of data wirings electrically connected to the display driving circuit. The metal shielding layer is located on the first surface of the first flexible substrate, and is located between the first flexible substrate and the first metal pattern layer. The metal shielding layer is insulated from the first metal pattern layer. A ratio of a longitudinal length, in a direction from the body area to the connection area, of the metal shielding layer to a longitudinal length, in the direction from the body area to the connection area, of the flexible printed circuit is in a range of 20% to 40%, inclusive. The first metal pattern layer and the second metal pattern layer have an overlapping area therebetween in a direction from the second surface to the first surface. The metal shielding layer is located at least in the overlapping area.

In some embodiments, the touch panel includes a plurality of self-capacitance electrodes spaced apart from each other. The self-capacitance electrodes are respectively electrically connected to the first touch wirings. The first metal pattern layer further includes a plurality of first pads. The first pads are respectively electrically connected to the first touch wirings, and are electrically connected to the touch chip. The touch chip is used for sending touch drive signals to respective first touch wirings, and for receiving touch detection signals from respective first touch wirings.

In some embodiments, the touch display module further includes a first bonding portion, and the first bonding portion includes a plurality of first welding pads. The electrode leads are respectively electrically connected to the first welding pads, and are respectively electrically connected to the self-capacitance electrodes. The flexible printed circuit includes a second bonding portion, and the second bonding portion includes a plurality of second welding pads. The second welding pads are respectively electrically connected to the first welding pads, and are respectively electrically connected to the first touch wirings.

In some embodiments, the touch panel includes first touch electrodes and second touch electrodes that transversely and longitudinally cross and are insulated from each other. The first metal pattern layer further includes second touch wirings insulated from the first touch wirings. The first touch electrodes are respectively electrically connected to the first touch wirings, and the second touch electrodes are respectively electrically connected to the second touch wirings. The first metal pattern layer further includes a plurality of first pads and a plurality of second pads. The first pads are respectively electrically connected to the first touch wirings, and are electrically connected to the touch chip. The second pads are respectively electrically connected to the second touch wirings, and are electrically connected to the touch chip. The touch chip is used for sending touch drive signals to respective first touch wirings, and for receiving touch detection signals from respective second touch wirings; or the touch chip is used for sending touch drive signals to respective second touch wirings, and for receiving touch detection signals from respective first touch wirings.

In some embodiments, the touch panel includes first touch electrodes and second touch electrodes that transversely and longitudinally cross and are insulated from each other. The second metal pattern layer further includes second touch wirings insulated from the data wirings. The first touch electrodes are respectively electrically connected to the first touch wirings, and the second touch electrodes are respectively electrically connected to the second touch wirings. The first metal pattern layer further includes a plurality of first pads and a plurality of second pads. The flexible printed circuit further includes a plurality of through holes. The first pads are respectively electrically connected to the first touch wirings, and are electrically connected to the touch chip. First ends of the through holes respectively extend to the second pads, and the second pads are electrically connected to the touch chip. Second ends of the through holes respectively extend to the second touch wirings. The touch chip is used for sending touch drive signals to respective first touch wirings, and for receiving touch detection signals from respective second touch wirings; or the touch chip is used for sending touch drive signals to respective second touch wirings, and for receiving touch detection signals from respective first touch wirings.

In some embodiments, the touch display module includes a first bonding portion, and the first bonding portion includes a plurality of third welding pads and a plurality of fourth welding pads. The plurality of electrode leads include a plurality of first electrode leads and a plurality of second electrode leads. The first electrode leads are respectively electrically connected to the third welding pads, and are respectively electrically connected to the first touch electrodes. The second electrode leads are respectively electrically connected to the fourth welding pads, and are respectively electrically connected to the second touch electrodes. The flexible printed circuit includes a second bonding portion, and the second bonding portion includes a plurality of fifth welding pads and sixth welding pads. The fifth welding pads are respectively electrically connected to the third welding pads, and are respectively electrically connected to the first touch wirings. The sixth welding pads are respectively electrically connected to the fourth welding pads, and are respectively electrically connected to the second touch wirings.

In some embodiments, the second bonding portion and the data wirings are arranged in a same layer, and are made of a same material.

In some embodiments, the touch display device further includes a first ACF adhesive and a second ACF adhesive. The first ACF adhesive and the second ACF adhesive are stacked, and are located between the first bonding portion and the second bonding portion. The first ACF adhesive is adhered to the first bonding portion, the second ACF is adhered to the second bonding portion, and the first ACF adhesive is adhered to the second ACF adhesive.

In some embodiments, the touch display device further includes a first connector, a second connector and a control mainboard. The first connector is electrically connected to the control mainboard and the second connector. The flexible printed circuit further includes a third bonding portion, and the third bonding portion includes a plurality of seventh welding pads. The seventh welding pads are electrically connected to the second connector.

In some embodiments, the plurality of seventh welding pads and the first touch wirings are arranged in a same layer, and are made of a same material.

In some embodiments, the plurality of seventh welding pads and the data wirings are arranged in a same layer, and are made of a same material.

In some embodiments, the flexible printed circuit further includes: a first dielectric layer covering a surface of the first metal pattern layer away from the first flexible substrate; a second dielectric layer located between the first metal pattern layer and the metal shielding layer; and a third dielectric layer covering a surface of the second metal pattern layer away from the first flexible substrate.

In some embodiments, the flexible printed circuit further includes: a first dielectric layer covering a surface of the first metal pattern layer away from the first flexible substrate; a second flexible substrate located between the first metal pattern layer and the metal shielding layer and in contact with the first metal pattern layer; an adhesive layer located between the second flexible substrate and the metal shielding layer and in contact with the second flexible substrate and the metal shielding layer; and a third dielectric layer covering a surface of the second metal pattern layer away from the first flexible substrate.

In some embodiments, the flexible printed circuit further includes: a first electromagnetic shielding layer covering a surface of the first dielectric layer away from the first flexible substrate; and a second electromagnetic shielding layer covering a surface of the third dielectric layer away from the first flexible substrate.

In some embodiments, the touch display device further includes electronic components, and the electronic components include at least a capacitor and a resistor. The first metal pattern layer further includes third pads respectively electrically connected to the electronic components. The touch display device further includes a first support pad connected to the third dielectric layer. A vertical projection of an electronic component in the electronic components on the first flexible substrate is located within a vertical projection of the first support pad on the first flexible substrate. The first support pad is used for supporting the electronic component.

In some embodiments, the touch display device further includes a second support pad connected to a side of the flexible printed circuit away from the second connector. A vertical projection of the second connector on the first flexible substrate is located within a vertical projection of the second support pad on the first flexible substrate. The second support pad is used for supporting the second connector.

In some embodiments, the touch display device includes a fingerprint recognition element disposed on the control mainboard. The flexible printed circuit is provided with a mounting hole penetrating the flexible printed circuit. The mounting hole is used for accommodating the fingerprint recognition element when part of the flexible printed circuit is bent to a back of the touch display module.

In some embodiments, a thickness of the metal shielding layer in the direction from the second surface to the first surface is in a range of 5 µm to 20 µm, inclusive.

In some embodiments, the first bonding portion further includes a plurality of eighth welding pads. The display driving circuit is a display driving chip, and the display driving chip is electrically connected to the eighth welding pads. Alternatively, the display screen includes a base substrate and pixel driving circuits disposed on the base substrate. The display driving circuit is integrated on the base substrate, and is electrically connected to the pixel driving circuits and the eighth welding pads.

In some embodiments, a distance between wirings in a same layer in the flexible printed circuit is greater than or equal to 0.05 mm.

In some embodiments, the flexible printed circuit further includes an antistatic portion. The antistatic portion includes a metal substrate, and a connection hole is disposed in the metal substrate. The metal substrate and the second metal pattern layer are arranged in a same layer, and are made of a same material. The metal substrate is insulated from the data wirings.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
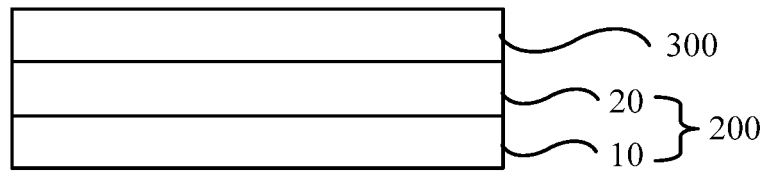
FIG. 1 is a sectional view of a touch display device, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic designations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and extensions thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of the phrase "applicable to" or "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

As used herein, the term such as "about," "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of areas are enlarged for clarity. Thus, variations in shape relative to the accompanying drawings due to, for example, manufacturing techniques and/or tolerances may be envisaged. Therefore, the exemplary embodiments should not be construed to be limited to the shapes of areas shown herein, but to include deviations in shape due to, for example, manufacturing. For example, an etched area shown in a rectangular shape generally has a curved feature. Therefore, the areas shown in the accompanying drawings are schematic in nature, and their shapes are not intended to show actual shapes of the areas in a device, and are not intended to limit the scope of the exemplary embodiments.

With the rapid development of display technologies, FMLOC display devices gradually become popular in people's lives. In order to reduce manufacturing costs of the FMLOC display device, improve a yield, and reduce an interference between a touch signal (i.e., touch detection signal or touch drive signal below) and a display data signal, embodiments of the present disclosure provide a touch display device. The touch display device may be an electronic product with a touch display function, such as a mobile phone, a tablet computer (also referred to as a pad), a television, or a smart wearable product (e.g., a smart watch or a smart bracelet). The specific form of the touch display device is not particularly limited in the embodiments of the present disclosure.

As shown in FIG. 1 (FIG. 1 is a sectional view of the touch display device 100), the touch display device 100 may include a touch display module 200. The touch display module 200 may include a display screen 10, and a touch panel 20 disposed on a side of the display screen 10 where a display surface of the display screen 10 is located. In some embodiments of the present disclosure, in order to protect the touch panel 20, the touch display device 100 may further include a cover plate 300. The cover plate 300 is disposed on a side of the touch panel 20 away from the display screen 10.

It will be noted that the cover plate 300 may be a substrate made of a material such as glass, polyethylene terephthalate (PET) or polycarbonate (PC), or may be made of a flexible material, which is not specifically limited.

Figure 2:
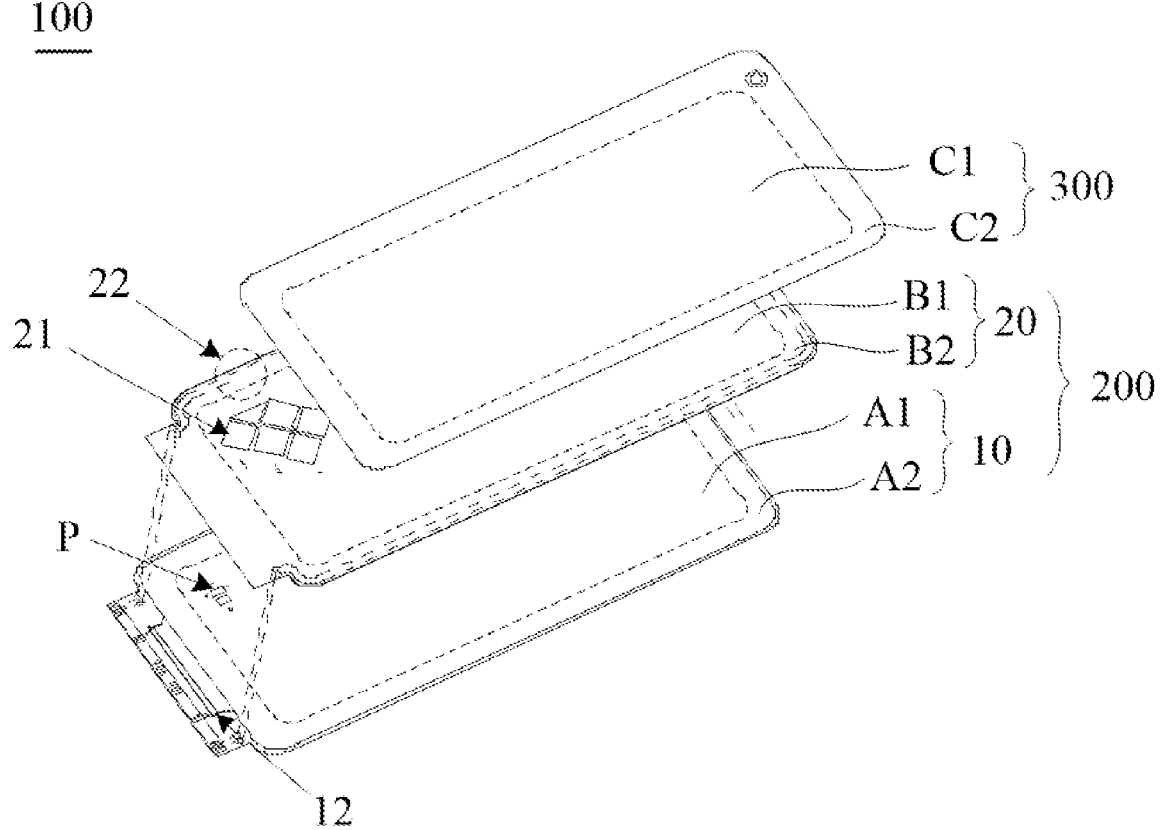
FIG. 2 is a structural diagram of a touch display device, in accordance with some embodiments.

For further clarity of the description of the touch display device 100, as shown in FIG. 2, a main structure of the touch display device 100 is shown.

As shown in FIG. 2, the display screen 10 may have a display area A1 and a non-display area A2 located on at least one side of the display area A1. FIG. 2 exemplarily illustrates that the non-display area A2 surrounds the display area A1, which is not limited thereto. The display area A1 may include a plurality of sub-pixels P for image display and pixel driving circuits (not shown in this figure) for providing driving signals to the sub-pixels P. The non-display area A2 is mainly used for wirings. For example, a display driving circuit 12 may be provided in the non-display area A2, and display data signals each are transmitted to corresponding pixel driving circuits by using the display driving circuit 12, so that the image display of the touch display device 100 may be realized.

In addition, as shown in FIG. 2, the touch panel 20 has a touch area B1 provided with a plurality of touch electrodes 21, and a peripheral area B2 disposed on a periphery of the touch area B1 and provided with electrode leads 22 electrically connected to the touch electrodes 21. For example, in a case where the touch panel 20 has substantially the same size as the display screen 10, the touch area B1 corresponds to the display area A1, and the peripheral area B2 corresponds to the non-display area A2.

It will be noted that a line width of the electrode lead 22 is not specifically limited in the embodiments of the present disclosure, and may be in a range of 3 µm to 20 µm, inclusive.

In a case where the touch display device 100 includes the cover plate 300, as shown in FIG. 2, the cover plate 300 may have a light-transmitting area C1 and a light-shielding area C2. At least part of the light-transmitting area C1 and the display area A1 of the display screen 10 may have an overlapping area therebetween, so that the light-transmitting area C1 may allow light generated from the display screen 10 to pass therethrough to the outside to be seen by human eyes. The light-shielding area C2 may be disposed on a periphery of the light-transmitting area C1, and at least part of the light-shielding area C2 and the non-display area A2 of the display screen 10 may have an overlapping area therebetween.

It will be noted that the display screen 10 may be a liquid crystal display (LCD) or an electroluminescent display screen. In a case where the display screen 10 is the electroluminescent display screen, the electroluminescent display screen may be an organic light-emitting diode (OLED) display screen or a quantum dot light-emitting diode (QLED) display screen.

In addition, in some embodiments of the present disclosure, in a case where the touch display module 200 includes the touch panel 20, for example, the touch panel 20 may be a touch panel that senses a user's touch, and coordinate information from an external input may be obtained by an approach or touch of a user's finger. In some embodiments, the touch panel 20 may sense the external input in a capacitive manner.

A specific structure and an operating process of the touch display device 100 will be described in detail below with reference to different capacitive touch manners.

Example 1, in some embodiments of the present disclosure, a self-capacitive touch technology may be used in the touch display device 100.

Figure 3:
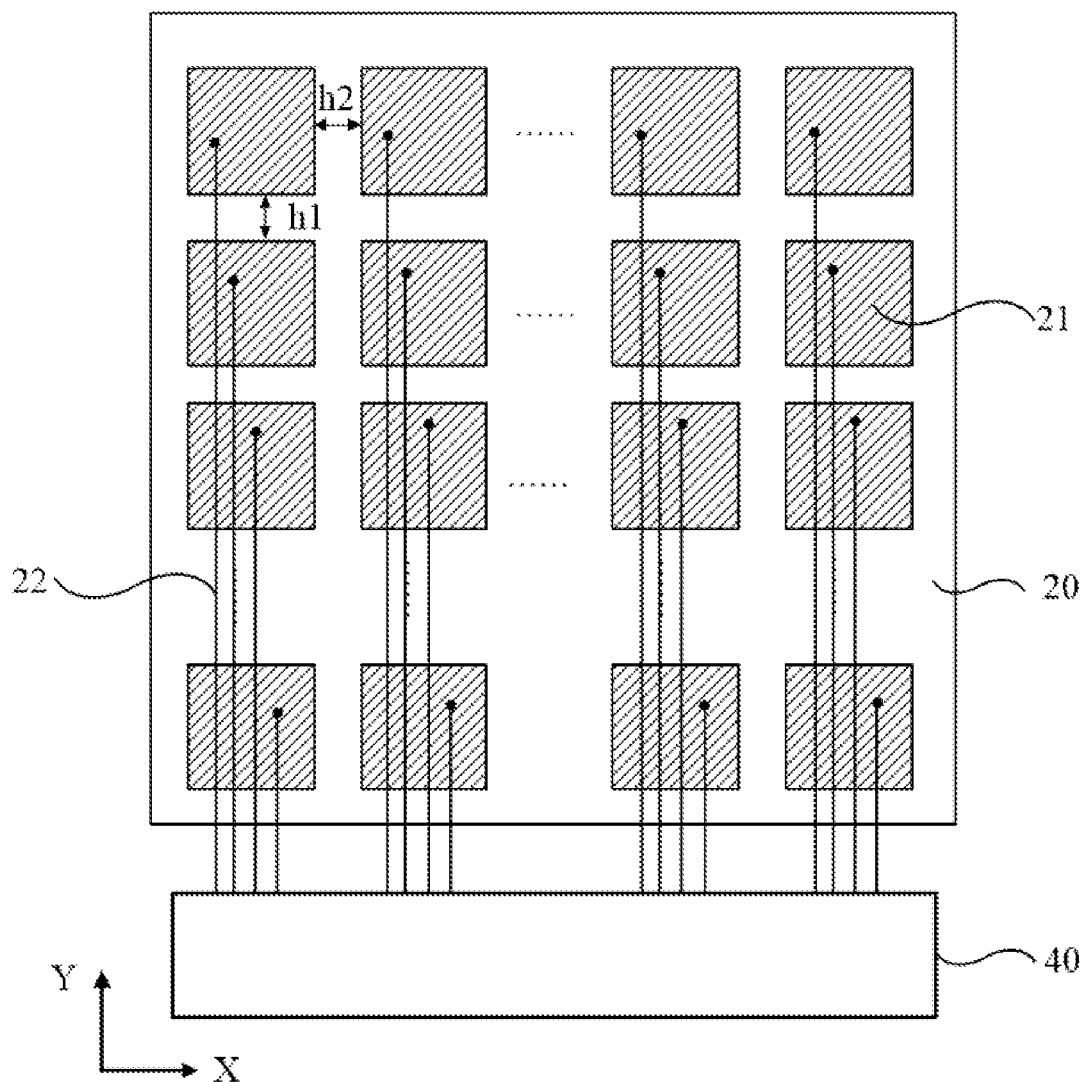
FIG. 3 is a structural diagram of a touch panel, in accordance with some embodiments.

In this case, the touch panel 20 may include a plurality of blocky self-capacitance electrodes 21 as shown in FIG. 3. The plurality of self-capacitance electrodes 21 may be spaced apart by a certain preset distance h1 along a first direction Y. In addition, the plurality of self-capacitance electrodes 21 may also be spaced apart by a certain preset distance h2 along a second direction X.

In this way, the plurality of self-capacitance electrodes 21 may be formed by using a same conductive layer. Since the plurality of self-capacitance electrodes 21 are not connected to each other, the plurality of self-capacitance electrodes 21 may be insulated from each other. The first direction Y and the second direction X may intersect.

Based on this, as shown in FIG. 3, in order to realize the driving and detection of a touch, the touch display device 100 further includes a touch chip 40, and each self-capacitance electrode 21 is electrically connected to the touch chip 40 through an electrode lead 22.

It will be noted that a material constituting the self-capacitance electrode 21 may include a transparent conductive material, such as indium tin oxide (ITO) or indium zinc oxide (IZO).

Figure 4A:
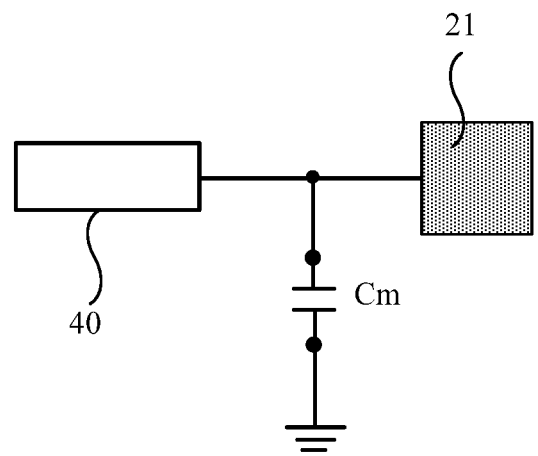
FIG. 4A is an equivalent circuit diagram of the touch panel shown in FIG. 3.

Moreover, as shown in FIG. 4A, a small parasitic capacitor Cm exists between the self-capacitance electrode 21 and a reference ground (e.g., GND). In a process of scanning the self-capacitance electrodes 21, the touch chip 40 detects charging and discharging time of the parasitic capacitor Cm. When a finger is not close to the self-capacitance electrode 21, the charging and discharging time of the parasitic capacitor Cm is a constant.

Figure 4B:
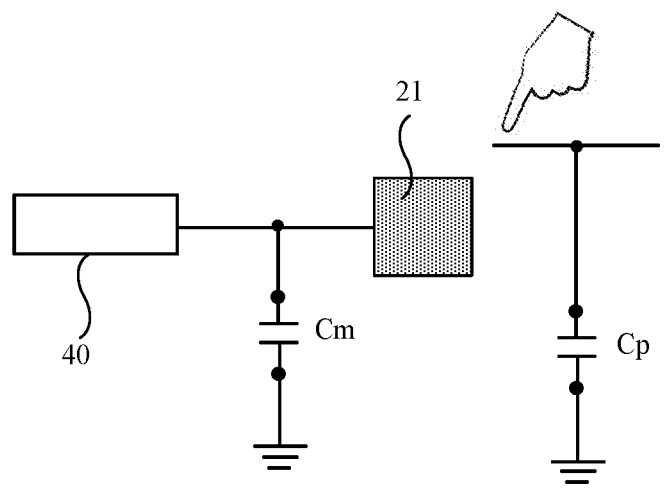
FIG. 4B is another equivalent circuit diagram of the touch panel shown in FIG. 3.

When the finger is close to the self-capacitance electrode 21, as shown in FIG. 4B, the finger may be equivalent to a reference ground (e.g., 0 V), and an equivalent capacitor Cp may be formed between the finger and the self-capacitance electrode 21. In this case, in the process of scanning the self-capacitance electrodes 21, the touch chip 40 is required to detect charging and discharging time of both the parasitic capacitor Cm and the equivalent capacitor Cp, so that the charging and discharging time of the capacitors detected by the touch chip 40 is greatly prolonged. Through the detected actual charging and discharging time and the charging and discharging time, as the constant, of the parasitic capacitor Cm, the touch chip 40 may calculate a capacitance of the equivalent capacitor Cp, thereby detecting the touch.

Figure 5:
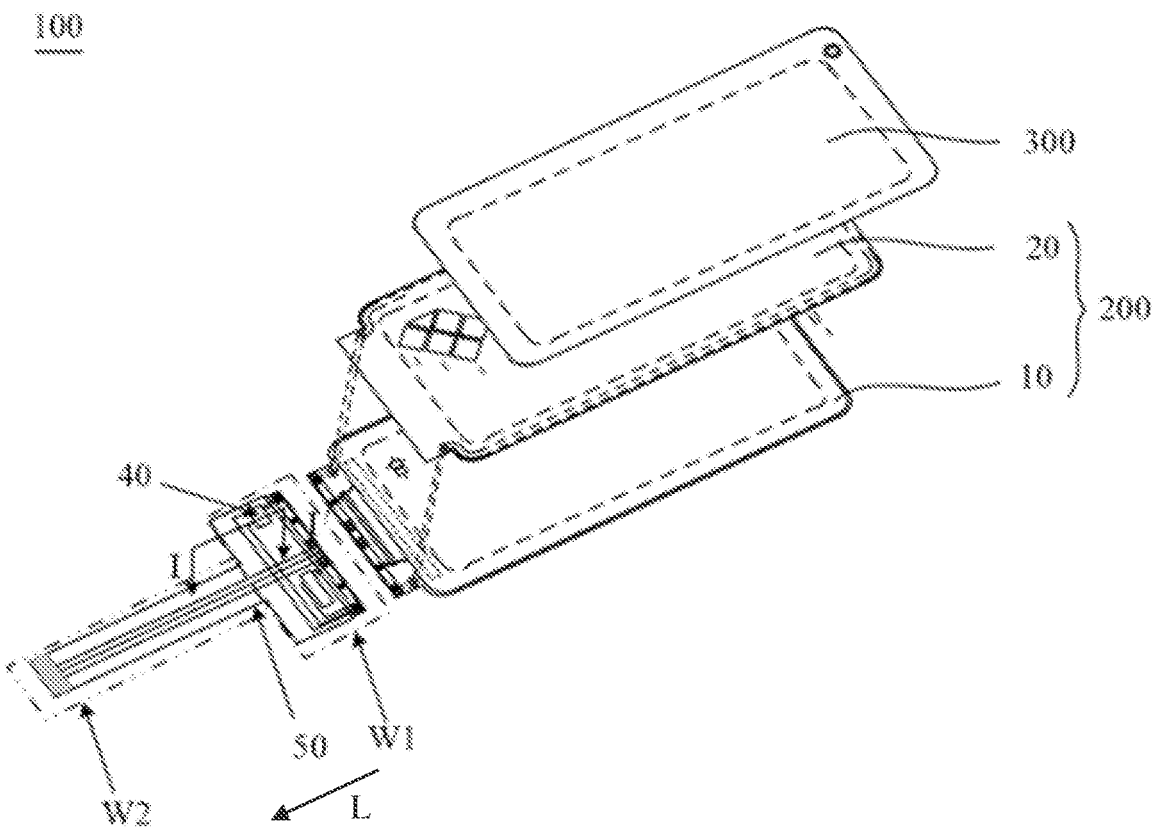
FIG. 5 is a structural diagram of a touch display device, in accordance with some other embodiments.

It can be seen from the above that in order to realize a driving process and a detection process of the touch, the touch chip 40 is required to be electrically connected to the self-capacitance electrodes 21 through the electrode leads 22. In order to arrange the touch chip 40 in the touch display device 100, in some embodiments of the present disclosure, as shown in FIG. 5, the touch display device 100 further includes a flexible printed circuit 50. The flexible printed circuit 50 has a body area W1 and a connection area W2 located on a side of the body area W1. The touch chip 40 is disposed in the body area W1 of the flexible printed circuit 50, and is electrically connected to the flexible printed circuit 50.

In the embodiments of the present disclosure, the flexible printed circuit 50 may have different stacking structures, and the different stacking structures correspond to different manufacturing methods.

Hereinafter, the different stacking structures and the manufacturing methods of the flexible printed circuit 50 will be described in detail.

Figure 6:
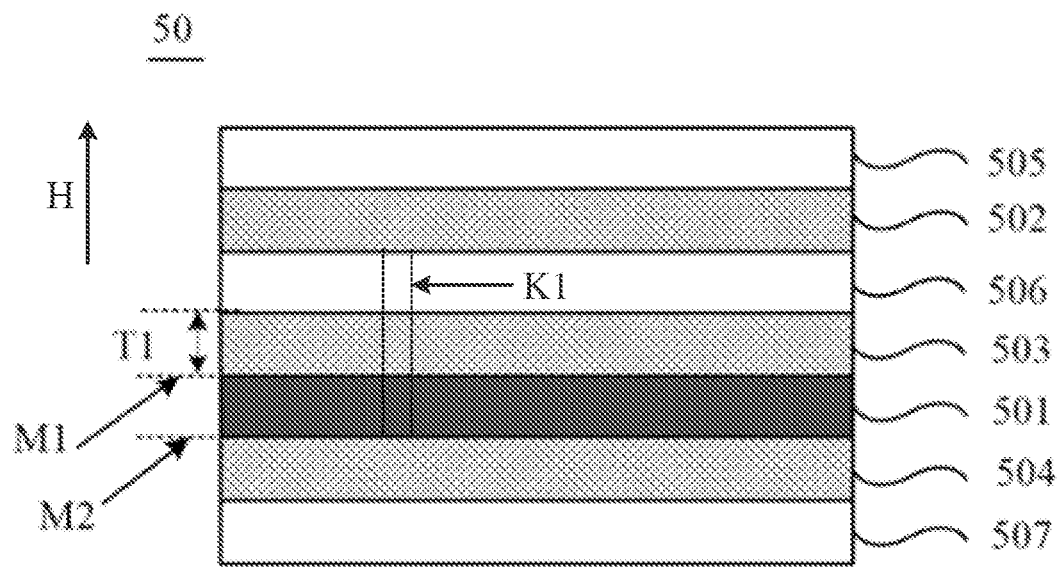
FIG. 6 is a sectional view of the flexible printed circuit shown in FIG. 5 taken along the I-I' direction.

For example, in some embodiments of the present disclosure, as shown in FIG. 6 (FIG. 6 is a sectional view taken along the I-I' direction in FIG. 5), the flexible printed circuit 50 may include a first flexible substrate 501, a first metal pattern layer 502, a metal shielding layer 503, a second metal pattern layer 504, a first dielectric layer 505, a second dielectric layer 506 and a third dielectric layer 507.

As shown in FIG. 6, the first flexible substrate 501 includes a first surface M1 and a second surface M2 arranged opposite to each other. The first metal pattern layer 502 is located on a side of the first flexible substrate 501 where the first surface M1 is located. The second metal pattern layer 504 is located on the second surface M2 of the first flexible substrate 501. The metal shielding layer 503 is located on the first surface M1 of the first flexible substrate 501, and is located between the first flexible substrate 501 and the first metal pattern layer 502.

In order to insulate the first metal pattern layer 502 from the metal shielding layer 503, the second dielectric layer 506 is disposed between the first metal pattern layer 502 and the metal shielding layer 503. The first dielectric layer 505 covers a surface of the first metal pattern layer 502 away from the first flexible substrate 501. The third dielectric layer covers a surface of the second metal pattern layer 504 away from the first flexible substrate 501.

It will be noted that the first dielectric layer 505, the second dielectric layer 506 and the third dielectric layer 507 are insulating layers, and a material of the insulating layer is not specifically limited in the embodiments of the present disclosure. A material of the first flexible substrate 501 is not specifically limited in the embodiments of the present disclosure. For example, the material of the first flexible substrate 501 may be polyimide (PI).

In addition, the thickness T1 of the metal shielding layer 503 may be in a range of 5 μm to 20 μm, inclusive (i.e., 5 μm≤T1≤20 μm). For example, T1 may be 9 μm, 12 μm, 15 μm, or 18 μm. In a case where the thickness T1 of the metal shielding layer 503 is less than 5 μm, a requirement for a manufacturing process is high, so that the yield of the flexible printed circuit is not high. In a case where the thickness T1 of the metal shielding layer 503 is greater than 20 μm, resources are wasted, and when the flexible printed circuit 50 is bent to a back of the touch display device 100, a space reserved for a battery cabin during the assembly of the entire device.

Figure 7A:
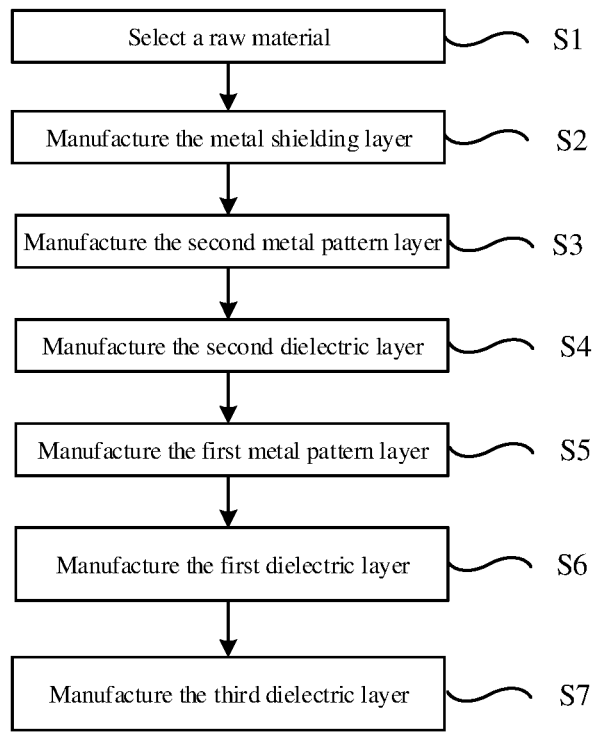
FIG. 7A is a flow diagram of a manufacturing method of the flexible printed circuit shown in FIG. 6.

In this case, the manufacturing method of the flexible printed circuit 50 may be shown in FIG. 7A. Details are as follows.

Figure 7B:
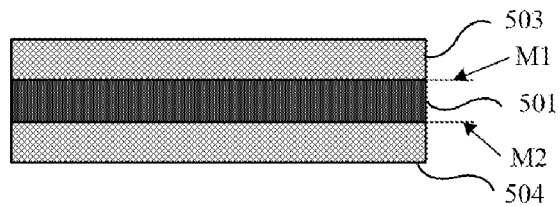
FIGS. 7B, 7D, 7E and 7G are process diagrams of the manufacturing method shown in FIG. 7A.

In S1, a raw material is selected. As shown in FIG. 7B, the raw material has the first flexible substrate 501. Moreover, the raw material further has a metal layer located on the side of the first flexible substrate 501 where the first surface M1 is located, and another metal layer located on a side of the first flexible substrate 501 where the second surface M2 is located.

It will be noted that materials of the foregoing metal layers are not specifically limited. For example, the materials of the foregoing metal layers each may be copper with good conductivity.

In S2, the metal shielding layer 503 is manufactured. The metal layer located on the first surface M1 is patterned by a photolithography process to obtain the metal shielding layer 503. The metal shielding layer 503 is located in the body area W1 of the flexible printed circuit 50.

It will be noted that the photolithography process may include exposure, development, etching and other processes. Following photolithography processes each may include those processes, and will not be repeated later.

Figure 7C:
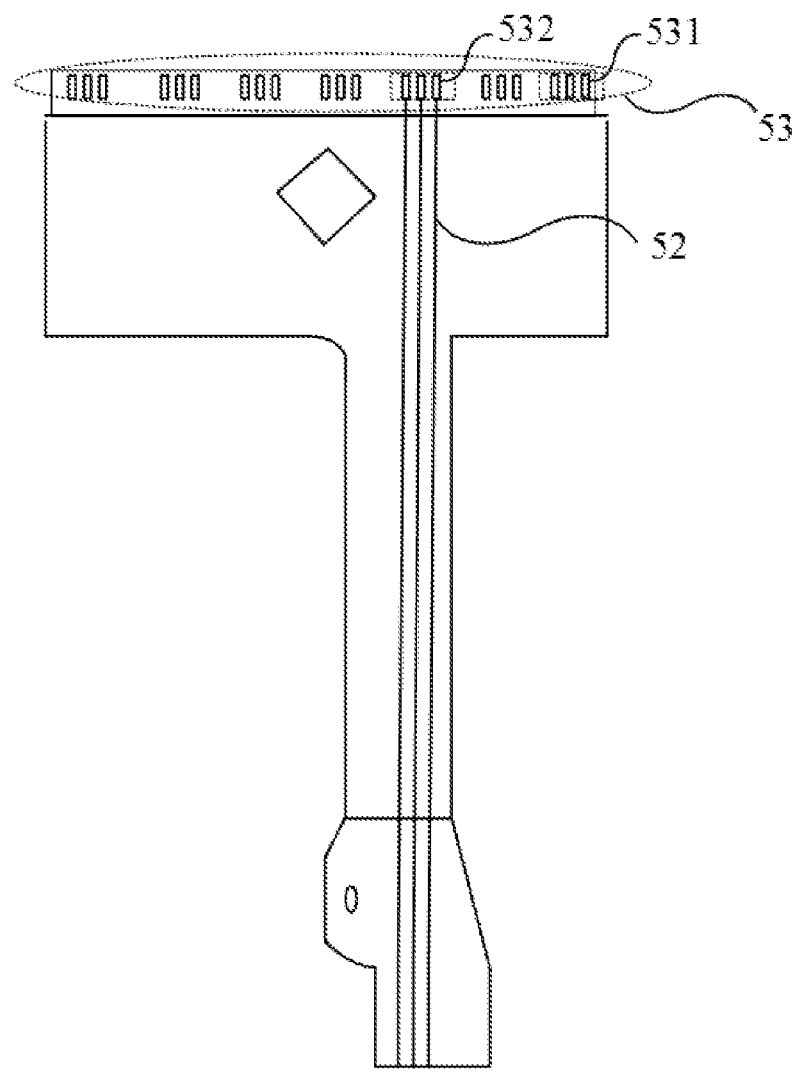
FIG. 7C is a structural diagram of a flexible printed circuit, in accordance with some embodiments.

In S3, the second metal pattern layer 504 is manufactured. The metal layer located on the second surface M2 is patterned by a photolithography process to obtain the second metal pattern layer 504. As shown in FIG. 7C, the second metal pattern layer 504 may include a plurality of data wirings 52. An end of the data wiring 52 may be electrically connected to the display driving circuit 12 (as shown in FIG. 2) in the touch display device 100, and another end of the data wiring 52 is electrically connected to a control mainboard (not shown in the figure), so that display data signals transmitted by the control mainboard may be provided to the display driving circuit 12, and then are provided to the sub-pixels for displaying an image.

It will be noted that an order of S2 and S3 may be interchanged. The metal shielding layer 503 may be manufactured, and then the second metal pattern layer 504 is manufactured. Alternatively, the second metal pattern layer 504 may be manufactured, and then the metal shielding layer 503 is manufactured. In addition, in order to simplify the figure, only three data wirings 52 are taken as an example in FIG. 7C for description, which is not limited thereto. The number of the wirings in the following drawings is only schematic, and will not be described later.

Figure 7D:
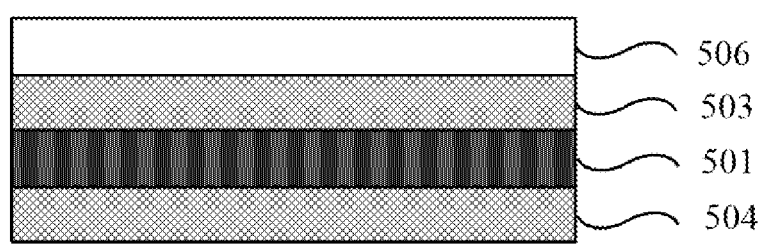

In S4, the second dielectric layer 506 is manufactured. As shown in FIG. 7D, the second dielectric layer 506 is manufactured on a surface of the metal shielding layer 503 away from the first flexible substrate 501.

Figure 7E:
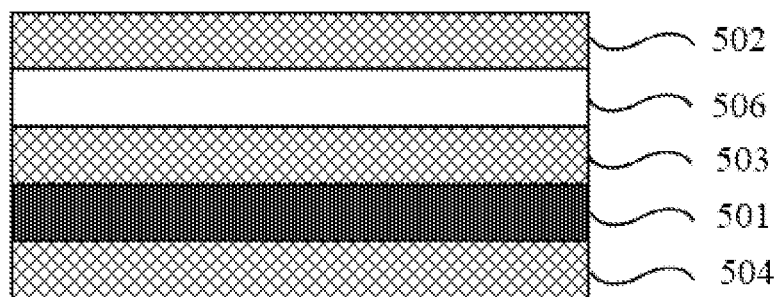
Figure 7F:
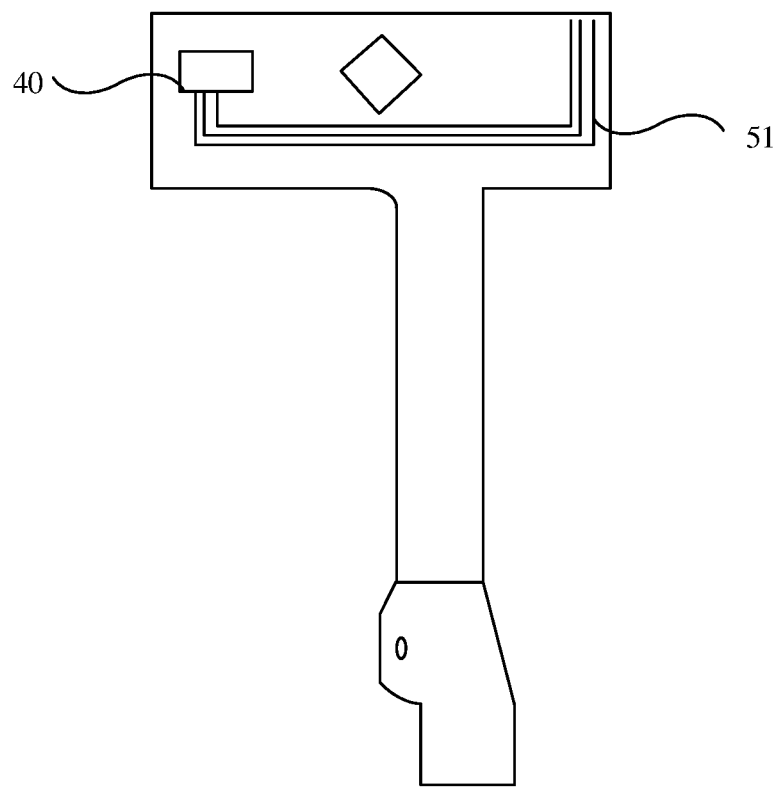
FIG. 7F is a structural diagram of a flexible printed circuit, in accordance with some other embodiments.

In S5, the first metal pattern layer 502 is manufactured. As shown in FIG. 7E, a first metal layer is formed on a surface of the second dielectric layer 506 away from the first flexible substrate 501, and the first metal pattern layer 502 is obtained by a photolithography process. As shown in FIG. 7F, the first metal pattern layer 502 includes a plurality of first touch wirings 51. An end of the first touch wiring 51 is electrically connected to the touch chip 40, and another end of the first touch wiring 51 is electrically connected to an electrode lead 22 (as shown in FIG. 3), so as to transmit the touch detection and touch drive signals in the touch display device 100.

It will be noted that in order to transmit the touch detection and touch drive signals and the display data signals to the touch display module 200 through the flexible printed circuit 50, the flexible printed circuit 50 further includes a second bonding portion 53. In some embodiments of the present disclosure, as shown in FIG. 7C, the second bonding portion 53 and the plurality of data wirings 52 are arranged in a same layer, and are made of a same material. That is, the second metal pattern layer 504 further includes the second bonding portion 53. The second bonding portion 53 includes at least a plurality of second welding pads 531 and a plurality of data wiring welding pads 532. The plurality of second welding pads 531, the plurality of data wiring welding pads 532 and the plurality of data wirings 52 may be arranged in the same layer, and may be made of the same material. In order to simplify the process, for example, the plurality of second welding pads 531, the plurality of data wiring welding pads 532 and the plurality of data wirings 52 may be obtained by using a same photolithography process.

It will be noted that in a case where the plurality of second welding pads 531 and the plurality of data wirings 52 are arranged in the same layer and made of the same material, in order to respectively electrically connect the another ends of the plurality of first touch wirings 51 to the plurality of second welding pads 531, the flexible printed circuit 50 further includes a plurality of through holes K1 (as shown in FIG. 6). An end of the through hole K1 extends to a first touch wiring 51, and another end of the through hole K1 extends to a second welding pad 531.

In some other embodiments of the present disclosure, the plurality of second welding pads 531, the plurality of data wiring welding pads 532 and the metal shielding layer 503 may be arranged in a same layer, and may be made of a same material. In yet other embodiments of the present disclosure, the plurality of second welding pads 531, the plurality of data wiring welding pads 532 and the first touch wirings 51 may be arranged in a same layer, and may be made of a same material.

For the convenience of description, as an example, the plurality of second welding pads 531, the plurality of data wiring welding pads 532 and the data wirings 52 are arranged in the same layer, and are made of the same material. In this case, the data wiring 52 may be directly electrically connected to the data wiring welding pad 532.

In addition, it will be noted that a line width of the first touch wiring 51 is greater than or equal to 0.05 mm. It can be seen from the above that the line width of the electrode lead 22 is only in the range of 3 μm to 20 μm, inclusive. Thus, it is easy to see that the line width of the first touch wiring 51 is greater than the line width of the electrode lead 22.

Figure 7G:
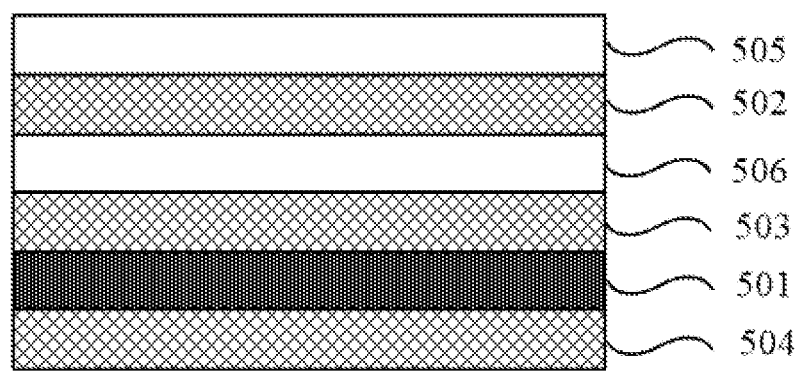

In S6, the first dielectric layer 505 is manufactured. As shown in FIG. 7G, in order to insulate and protect the first metal pattern layer 502, the first dielectric layer 505 is manufactured on a surface of the first metal pattern layer 502 away from the first flexible substrate 501.

In S7, the third dielectric layer 507 is manufactured. In order to insulate and protect the second metal pattern layer 504, the third dielectric layer 507 is manufactured on a surface of the second metal pattern layer 504 away from the first flexible substrate 501 to obtain the flexible printed circuit 50 shown in FIG. 6.

It will be noted that an order of S6 of manufacturing the first dielectric layer 505 and S7 of manufacturing the third dielectric layer 507 may be interchanged. The first dielectric layer 505 may be manufactured, and then the third dielectric layer 507 is manufactured. Alternatively, the third dielectric layer 507 may be manufactured, and then the first dielectric layer 505 is manufactured.

It will be noted that the manufacturing methods of the first dielectric layer 505, the second dielectric layer 506 and the third dielectric layer 507 are not specifically limited in the embodiments of the present disclosure. The manufacturing methods of the first dielectric layer 505, the second dielectric layer 506 and the third dielectric layer 507 may be the same or different.

Figure 8:
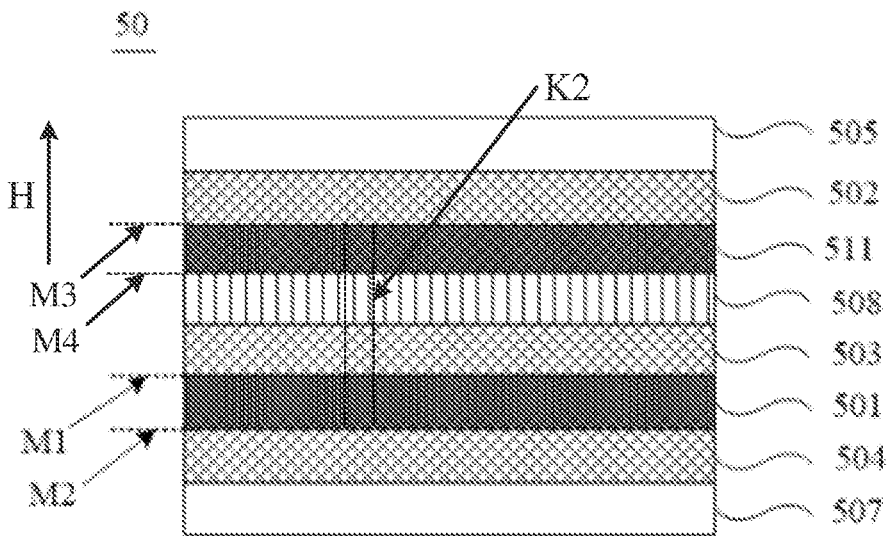
FIG. 8 is another sectional view of the flexible printed circuit shown in FIG. 5 taken along the I-I' direction.

For another example, in some other embodiments of the present disclosure, as shown in FIG. 8, the flexible printed circuit 50 may include a first flexible substrate 501, a first metal pattern layer 502, a metal shielding layer 503, a second metal pattern layer 504, a first dielectric layer 505, a third dielectric layer 507, a second flexible substrate 511 and an adhesive layer 508.

As shown in FIG. 8, the first flexible substrate 501 includes a first surface M1 and a second surface M2 arranged opposite to each other. The first metal pattern layer 502 is located on a side of the first flexible substrate 501 where the first surface M1 is located. The second metal pattern layer 504 is located on the second surface M2 of the first flexible substrate 501. The metal shielding layer 503 is located on the first surface M1 of the first flexible substrate 501, and is located between the first flexible substrate 501 and the first metal pattern layer 502.

The second flexible substrate 511 is disposed between the first metal pattern layer 502 and the metal shielding layer 503. The first metal pattern layer 502 and the metal shielding layer 503 are insulated from each other by using the second flexible substrate 511, and the second flexible substrate 511 is in contact with the first metal pattern layer 502. The adhesive layer 508 is included between the second flexible substrate 511 and the metal shielding layer 503, and the adhesive layer 508 is in contact with the second flexible substrate 511 and the metal shielding layer 503. The first dielectric layer 505 covers a surface of the first metal pattern layer 502 away from the first flexible substrate 501. The third dielectric layer 507 covers a surface of the second metal pattern layer 504 away from the first flexible substrate 501.

It will be noted that the first dielectric layer 505 and the third dielectric layer 507 are made of insulating materials, and types of the insulating materials are not specifically limited in the embodiments of the present disclosure. Specific materials of the first flexible substrate 501 and the second flexible substrate 511 are not limited. The materials of the first flexible substrate 501 and the second flexible substrate 511 may be the same or different. In a case where the materials of the first flexible substrate 501 and the second flexible substrate 511 are the same, for example, the materials of the first flexible substrate 501 and the second flexible substrate 511 may be PI.

Figure 9A:
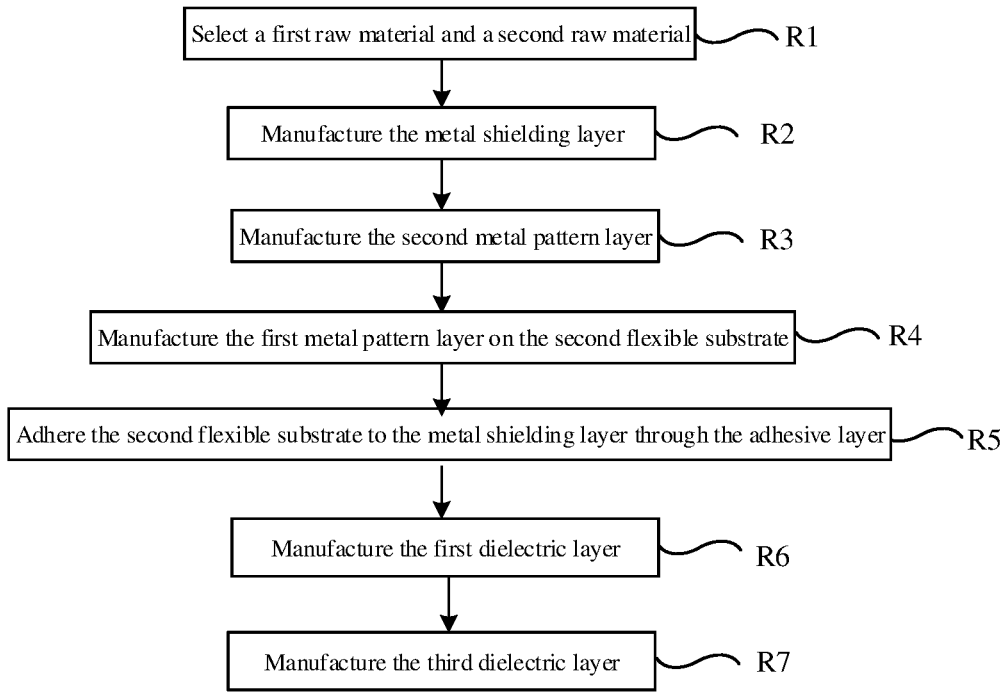
FIG. 9A is a flow diagram of a manufacturing method of the flexible printed circuit shown in FIG. 8.

In this case, the manufacturing method of the flexible printed circuit 50 is shown in FIG. 9A. Details are as follows.

Figure 9B:
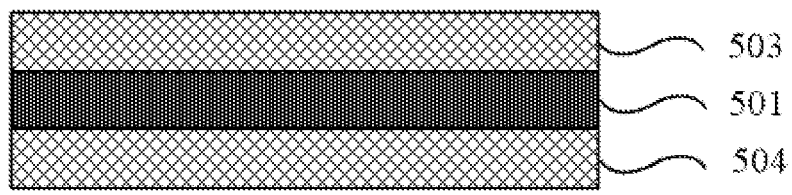
FIGS. 9B, 9C, 9D and 9E are process diagrams of the manufacturing method shown in FIG. 9A.

In R1, a first raw material and a second raw material are selected. The first raw material has the first flexible substrate 501. Moreover the first raw material further has a metal layer located on the side of the first flexible substrate 501 where the first surface M1 is located, and another metal layer located on a side of the first flexible substrate 501 where the second surface M2 is located. The second raw material has the second flexible substrate 511. Moreover, the second raw material further has a metal layer located on a side of the second flexible substrate 511 where a third surface M3 of the second flexible substrate 511 is located, and another metal layer located on a side of the second flexible substrate 511 where a fourth surface M4 of the second flexible substrate 511 is located. It will be noted that as shown in FIG. 9B, in a case where the materials of the first flexible substrate 501 and the second flexible substrate 511 are the same, and the foregoing metal layers are made of a same material, the first raw material and the second raw material are the same. In this way, a single raw material may be selected, and may be cut into two pieces to be used, thereby reducing costs.

In addition, the second raw material may have the second flexible substrate 511 and a metal layer located on a side of the second flexible substrate 511.

In R2, the metal shielding layer 503 is manufactured. The first raw material is selected, and the metal layer located on the first surface M1 is patterned by a photolithography process to obtain the metal shielding layer 503. A description of the manufacturing of the metal shielding layer 503 is similar to the above, and will not be repeated here.

In R3, the second metal pattern layer 504 is manufactured. The metal layer located on the second surface M2 is patterned by a photolithography process to obtain the second metal pattern layer 504.

It will be noted that an order of R2 and R3 may be interchanged. A wiring arrangement of the second metal pattern layer 504 is similar to the above, and will not be repeated here.

Figure 9C:
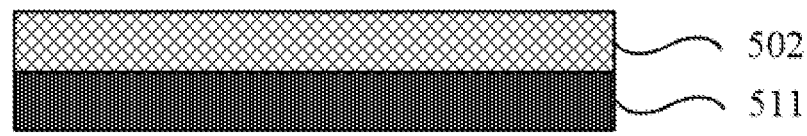

In R4, the first metal pattern layer 502 is manufactured on the second flexible substrate 511. As shown in FIG. 9C, the second raw material is selected. A metal layer located on a side of the second flexible substrate 511 is removed, and only a metal layer located on another side of the second flexible substrate 511 is left. The first metal pattern layer 502 is manufactured on the metal layer located on the another side by a photolithography process.

It will be noted that a process of removing the metal layer located on the side of the second flexible substrate 511 is not specifically limited. In addition, in a case where the second raw material includes only the second flexible substrate 511 and the metal layer located on the side of the second flexible substrate 511, it is only necessary to pattern the metal layer to obtain the first metal pattern layer 502, which may simplify the process. A wiring arrangement of the first metal pattern layer 502 is similar to the above, and will not be repeated here.

Figure 9D:
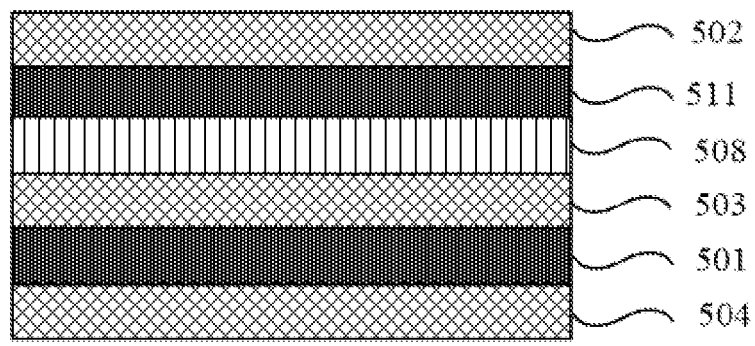

In R5, as shown in FIG. 9D, the second flexible substrate 511 is adhered to the metal shielding layer 503 through the adhesive layer 508.

Figure 9E:
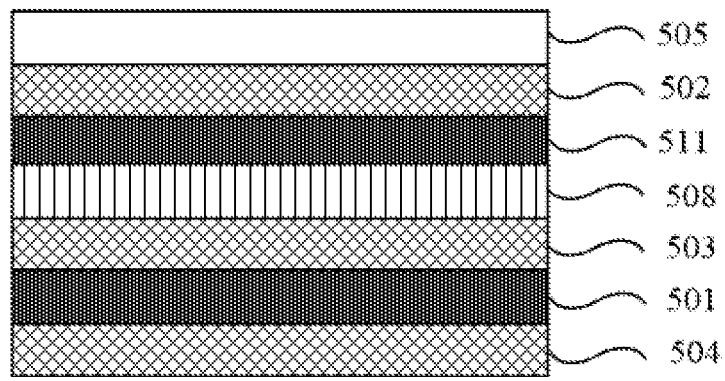

In R6, the first dielectric layer 505 is manufactured. As shown in FIG. 9E, on the basis of R5, the first dielectric layer 505 is formed on the surface of the first metal pattern layer 502 away from the second flexible substrate 511.

In R7, the third dielectric layer 507 is manufactured. The third dielectric layer 507 is formed on the surface of the second metal pattern layer 504 away from the first flexible substrate 501.

It will be noted that descriptions of R6 and R7 here are similar to the above, and will not be repeated here. The flexible printed circuit 50 as shown in FIG. 8 may be obtained after R7.

Figure 10:
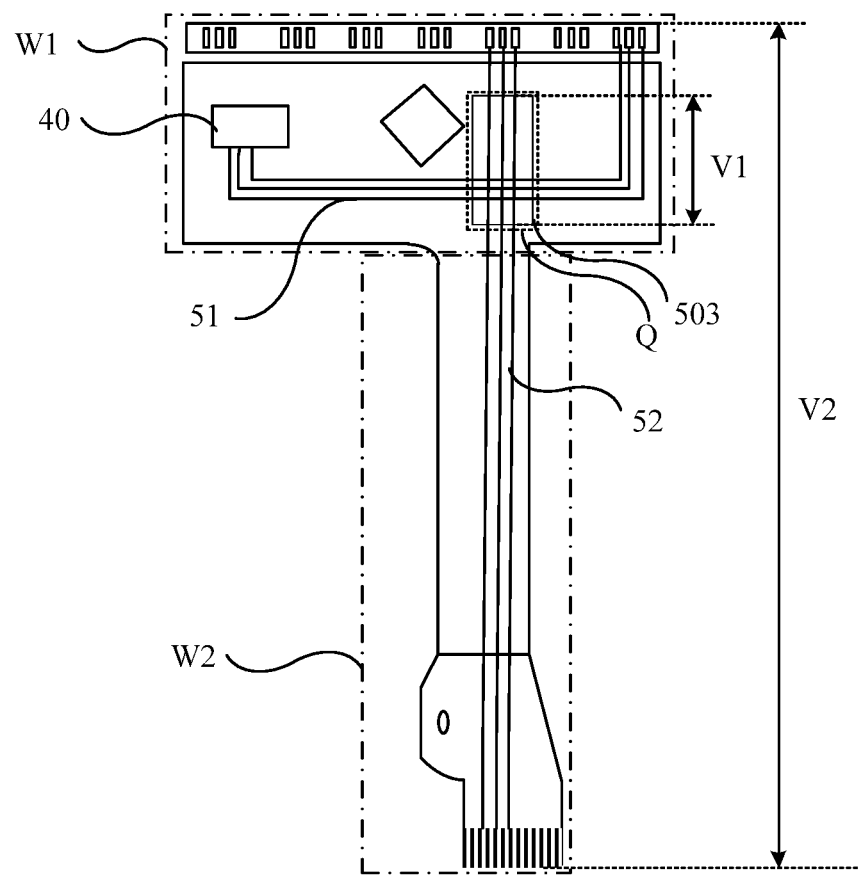
FIG. 10 is a structural diagram of a flexible printed circuit, in accordance with yet other embodiments.
Figure 11:
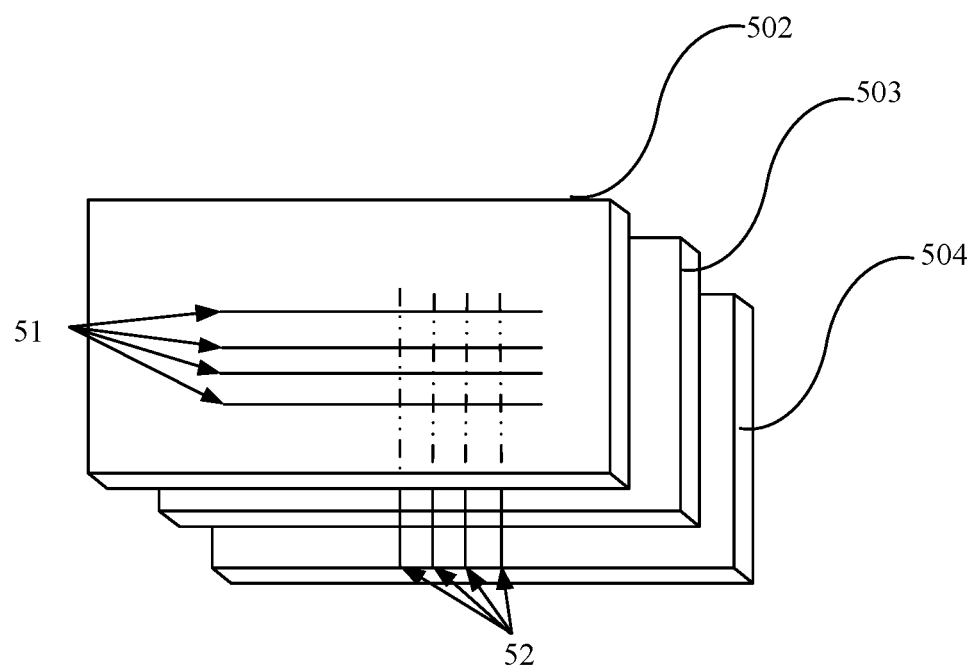
FIG. 11 is a diagram showing a partial spatial structure of a flexible printed circuit, in accordance with some embodiments.

On this basis, as shown in FIG. 10, the plurality of first touch wirings 51 in the first metal pattern layer 502 and the plurality of data wirings 52 in the second metal pattern layer 504 have an overlapping area Q therebetween in a direction H from the second surface M2 to the first surface M1. FIG. 11 is a diagram showing a partial spatial structure of the flexible printed circuit 50. It can be seen that the metal shielding layer 503 is located at least in the overlapping area Q (as shown in FIG. 10), and is located between the first metal pattern layer 502 and the second metal pattern layer 504.

In this way, the metal shielding layer 503 is disposed in the overlapping area Q, and is located between the first metal pattern layer 502 and the second metal pattern layer 504, so that the interference between the touch detection signal or the touch drive signal on the first touch wiring 51 and the display data signal on the data wiring 52 in the overlapping area Q may be effectively avoided.

Moreover, a structure with three layers (i.e., the first metal pattern layer 502, the metal shielding layer 503 and the second metal pattern layer 504) is disposed in the body area W1 (as shown in FIG. 10) of the flexible printed circuit 50, so that the manufacturing costs of the flexible printed circuit 50 may be significantly reduced, and a larger space may be reserved for the battery cabin during the assembly of the entire device. In addition, in a case where a structure with only two layers (i.e., only the first metal pattern layer 502 and the second metal pattern layer 504 without the metal shielding layer 503) is disposed in the connection area W2 (as shown in FIG. 10) of the flexible printed circuit 50, the costs may be further reduced, and a reliability of the connection area W2 of the flexible printed circuit 50 in a subsequent process may be ensured. For example, in a subsequent bending process, a signal transmission interruption, which is caused by tearing and breaking of the wiring in the connection area W2 due to an overlarge bending stress, does not occur in the connection area W2.

It will be noted that a specific shape of the flexible printed circuit 50 is not limited. In addition, the metal shielding layer 503 may be disposed only in the overlapping area of the data wirings 52 and the first touch wirings 51, or may be designed in the entire body area W1 of the flexible printed circuit 50, which is not limited.

In some embodiments of the present disclosure, as shown in FIG. 10, a ratio V1/V2 of a longitudinal length V1 of the metal shielding layer 503 to a longitudinal length V2 of the entire flexible printed circuit 50 may be in a range of 20% to 40%, inclusive. In a case where the ratio V1/V2 is less than 20%, since the longitudinal length V1 of the metal shielding layer 503 is short, the interference between the touch detection signal or the touch drive signal on the first touch wiring 51 and the display data signal on the data wiring 52 in the overlapping area Q cannot be effectively avoided. In a case where the ratio V1/V2 is greater than 40%, since the longitudinal length V1 of the metal shielding layer 503 is long, it is easy to waste resources and increase costs. The ratio V1/V2 may be in a range of 25% to 30%, inclusive. For example, the ratio V1/V2 may be 26%, 27%, 28%, or 29%. In this case, the metal shielding layer 503 may not only achieve a good signal crosstalk shielding effect, but also save costs.

The "longitudinal length" refers to a length in a direction L from the body area W1 to the connection area W2 of the flexible printed circuit 50, and is shown in FIG. 10.

On this basis, in order to shield a signal interference of the touch display device 100 to the flexible printed circuit 50, the flexible printed circuit 50 further includes a first electromagnetic shielding layer and a second electromagnetic shielding layer. For the convenience of description below, as an example, the flexible printed circuit 50 includes the adhesive layer 508.

Figure 12:
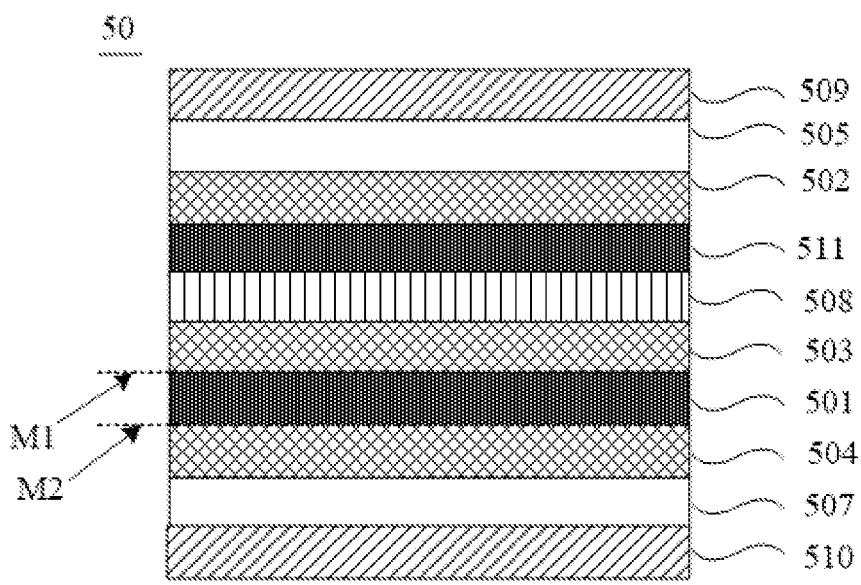
FIG. 12 is yet another sectional view of the flexible printed circuit shown in FIG. 5 taken along the I-I' direction.

As shown in FIG. 12, the flexible printed circuit 50 further includes the first shielding layer 509 covering a surface of the first dielectric layer 505 away from the first flexible substrate 501, and the second shielding layer 510 covering a surface of the third dielectric layer 507 away from the first flexible substrate 501.

In this way, the first electromagnetic shielding layer 509 and the second electromagnetic shielding layer 510 are disposed in the flexible printed circuit 50, so that the signal interference of the touch display device 100 to the flexible printed circuit 50 may be shielded.

It will be noted that specific materials of the first electromagnetic shielding layer 509 and the second electromagnetic shielding layer 510 are not limited. The materials of the first electromagnetic shielding layer 509 and the second electromagnetic shielding layer 510 may be the same or different.

In order to realize the touch and display of the touch display device 100, a process of transmitting the touch drive and touch detection signals in the touch display device 100 and a process of transmitting the display data signals in the touch display device 100 will be described in detail below.

Figure 13:
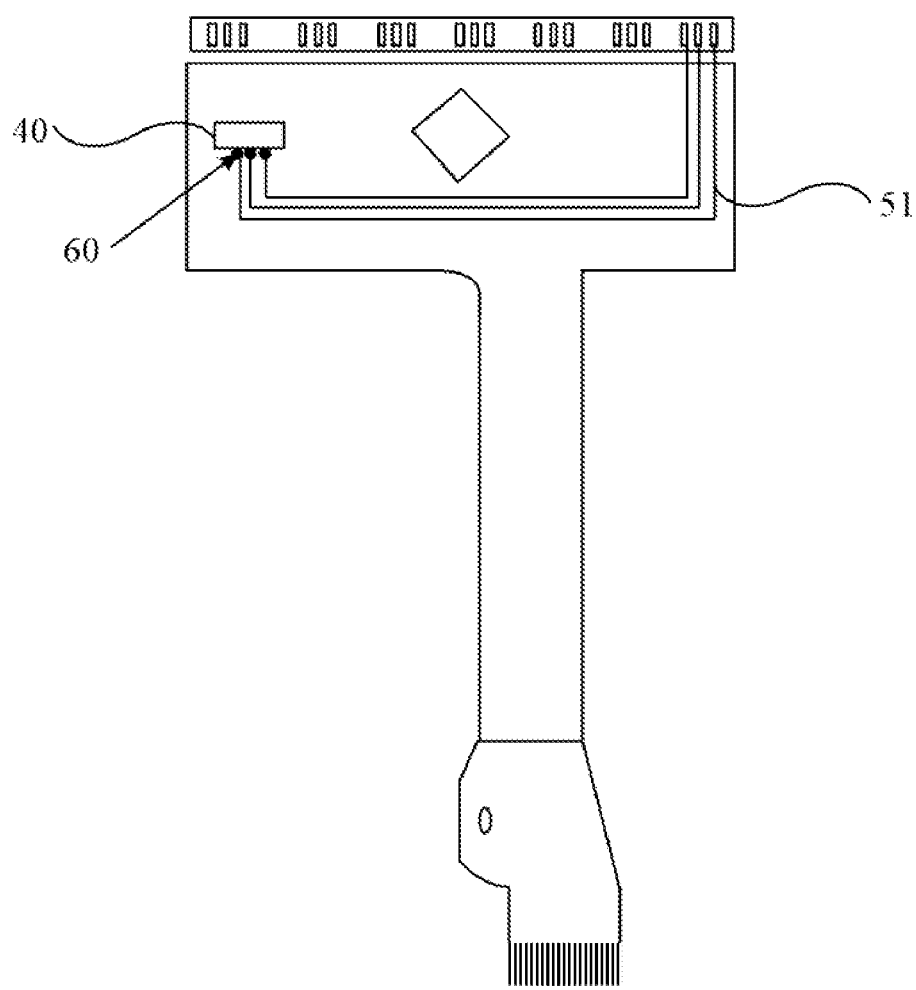
FIG. 13 is a structural diagram of a flexible printed circuit, in accordance with yet other embodiments.

As shown in FIG. 13, in the flexible printed circuit 50, the first metal pattern layer 502 further includes a plurality of first pads 60. The first pads 60 are respectively electrically connected to the first touch wirings 51, and are also electrically connected to the touch chip 40. In this way, the touch chip 40 may receive the touch detection signal on the first touch wiring 51, and may send the touch drive signal to the first touch wiring 51.

It will be noted that in addition to the positions of the plurality of first pads 60 shown in FIG. 13, the first pads 60 may be disposed within a coverage of the touch chip 40 shown in FIG. 13.

A specific process of the touch chip 40 receiving the touch detection signal from the first touch wiring 51 and sending the touch drive signal through the first touch wiring 51 will be described in detail below.

Figure 14:
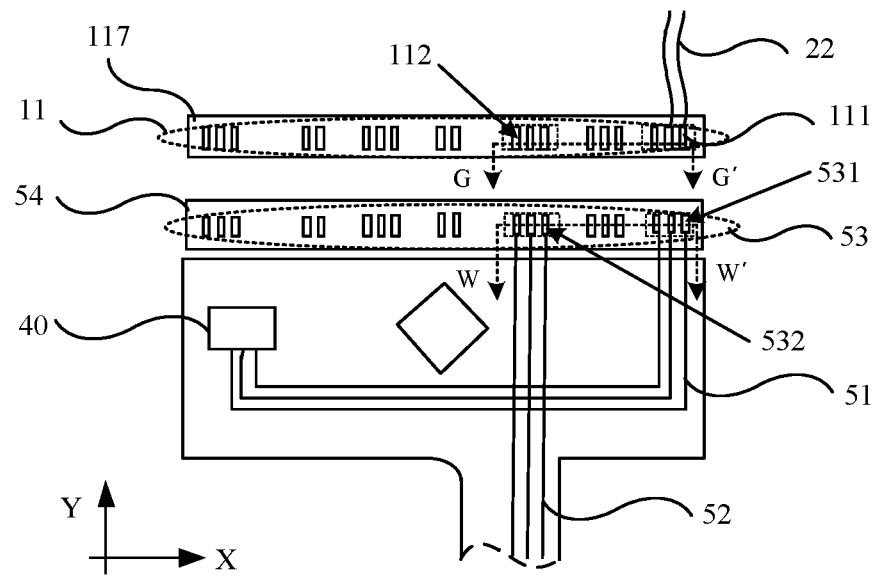
FIG. 14 a structural diagram of a touch display device, in accordance with yet other embodiments.

In some embodiments of the present disclosure, as shown in FIG. 14, the touch display device 100 may include a first bonding portion 11, and the first bonding portion 11 includes a plurality of first welding pads 111 and a plurality of eighth welding pads 112. The first welding pad 111 is electrically connected to an electrode lead 22, and the electrode lead 22 is electrically connected to a self-capacitance electrode 21 (as shown in FIG. 3). Therefore, in the touch display module 200, an end of the electrode lead 22 is electrically connected to the self-capacitance electrode 21, and another end of the electrode lead 22 is electrically connected to the first welding pad 111.

Figure 15A:
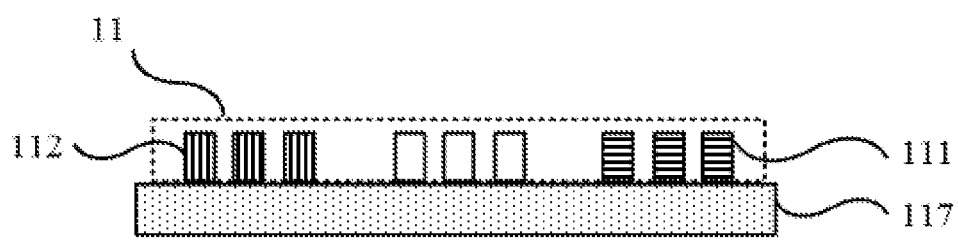
FIG. 15A is a sectional view of the touch display device shown in FIG. 14 taken along the G-G' direction.
Figure 15B:
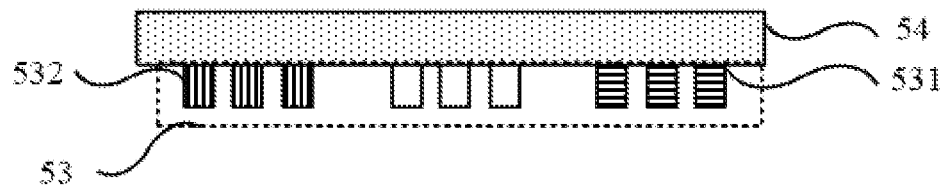
FIG. 15B is a sectional view of the touch display device shown in FIG. 14 taken along the W-W direction.

On this basis, as shown in FIG. 14, the touch display device 100 further includes a first anisotropic conductive film (ACF) adhesive 117 and a second ACF adhesive 54. As shown in FIG. 15A (FIG. 15A is a sectional view taken along the G-G' direction in FIG. 14), the first ACF adhesive 117 is adhered to the plurality of first welding pads 111 and the plurality of eighth welding pads 112 in the first bonding portion 11. Moreover, as shown in FIG. 15B (FIG. 15B is a sectional view taken along the W-W direction in FIG. 14), the second ACF adhesive 54 is adhered to the plurality of second welding pads 531 and the plurality of data wiring welding pads 532 in the second bonding portion 53.

Figure 15C:
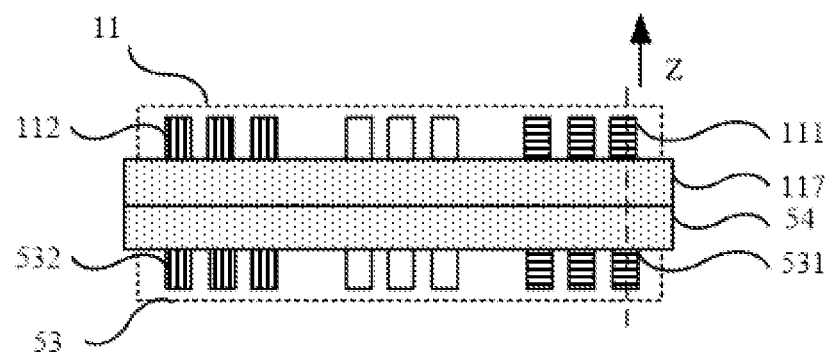
FIG. 15C is a diagram showing a connection structure of a first bonding portion and a second bonding portion, in accordance with some embodiments.

On this basis, as shown in FIG. 15C, the first ACF adhesive 117 and the second ACF adhesive 54 in the touch display device 100 are stacked and adhered, so that the second welding pad 531 may be electrically connected to the first welding pad 111, and the eighth welding pad 112 may be electrically connected to the data wiring welding pad 532. Moreover, the second welding pad 531 is also electrically connected to the first touch wiring 51.

It will be noted that in the embodiments of the present disclosure, in order to prevent mutual crosstalk between signals, the first welding pads 111 are spaced apart from each other to be insulated from each other. Similarly, the second welding pads 531 are spaced apart from each other to be insulated from each other. The eighth welding pads 112 are spaced apart from each other to be insulated from each other. The data wiring welding pads 532 are spaced apart from each other to be insulated from each other.

It will be noted that the first ACF adhesive 117 is adhered to the second ACF adhesive 54, so that the second welding pad 531 may be electrically connected to the first welding pad 111, and the eighth welding pad 112 may be electrically connected to the data wiring welding pad 532. This is mainly because an ACF adhesive has characteristics of transverse insulation and longitudinal conduction due to conductive particles filled in the ACF adhesive. Therefore, the first ACF adhesive 117 and the second ACF adhesive 54 each may realize insulation in the first direction Y and the second direction X shown in FIG. 14 and conduction in a third direction Z shown in FIG. 15C (e.g., a second welding pad 531 and a first welding pad 111 respectively located at corresponding positions on the broken line in FIG. 15C are electrically connected). In the embodiments of the present disclosure, the first ACF adhesive 117 and the second ACF adhesive 54 may be two parts respectively coated on the first bonding portion 11 and the second bonding portion 53, or may be of an integral structure. The first ACF adhesive 117 is coated on the first bonding portion 11 firstly, or the second ACF adhesive 54 is coated on the second bonding portion 53 firstly. Then, the first bonding portion 11 is bonded to the second bonding portion 53.

It can be seen from the above that the self-capacitance electrode 21 in the touch panel 20 is electrically connected to the first welding pad 111 of the first bonding portion 11 in the touch display module 200 through the electrode lead 22, and the first welding pad 111 is electrically connected to the second welding pad 531 of the second bonding portion 53 in the flexible printed circuit 50. In addition, the second welding pad 531 is electrically connected to the first touch wiring 51, and the first touch wiring 51 is electrically connected to the touch chip 40.

Therefore, in a case where the touch display module 200 is electrically connected to the flexible printed circuit 50 through the first bonding portion 11 and the second bonding portion 53, the touch chip 40 may be electrically connected to the self-capacitance electrodes 21 through respective first touch wirings 51 and respective electrode leads 22 in the touch panel 20.

In this way, the touch chip 40 may send the touch drive signal to the self-capacitance electrode 21 through the first touch wiring 51 and the electrode lead 22 in sequence, so as to realize the touch process of the self-capacitance electrode 21. For example, when the finger is not close to the touch panel 20, the charging and discharging time of the parasitic capacitor Cm detected by the touch chip is a constant. When the finger is close to the touch panel, the equivalent capacitor Cp is formed between the finger and self-capacitance electrode 21, so that the charging and discharging time of the capacitors detected by the touch chip 40 is greatly prolonged. In this case, the touch chip 40 calculates the capacitance of the equivalent capacitor Cp through the detected actual charging and discharging time and the charging and discharging time, as the constant, of the parasitic capacitor Cm, so as to achieve the purpose of touch detection.

The process of transmitting the display data signals in the touch display device 100 will be described in detail below.

Figure 16:
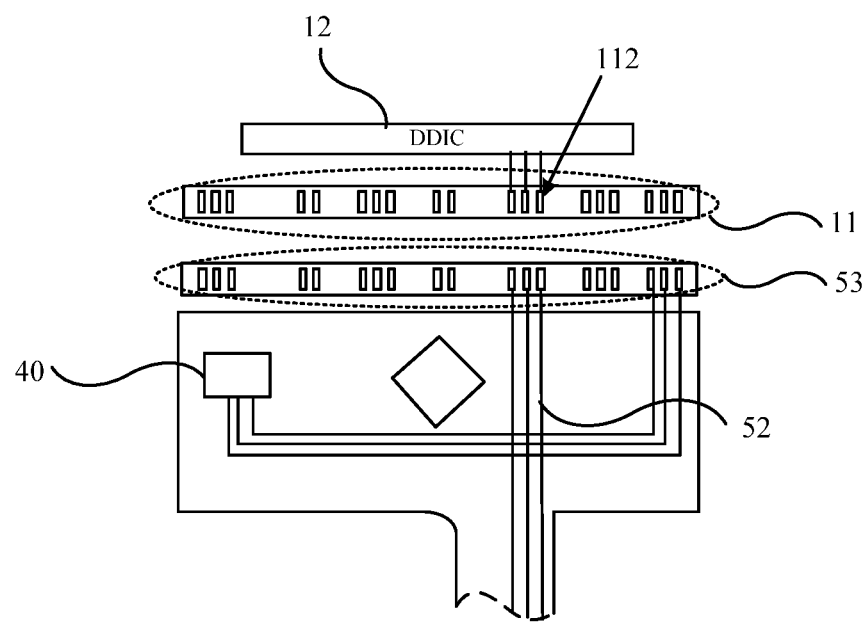
FIG. 16 is a structural diagram of a touch display device, in accordance with yet other embodiments.
Figure 17:
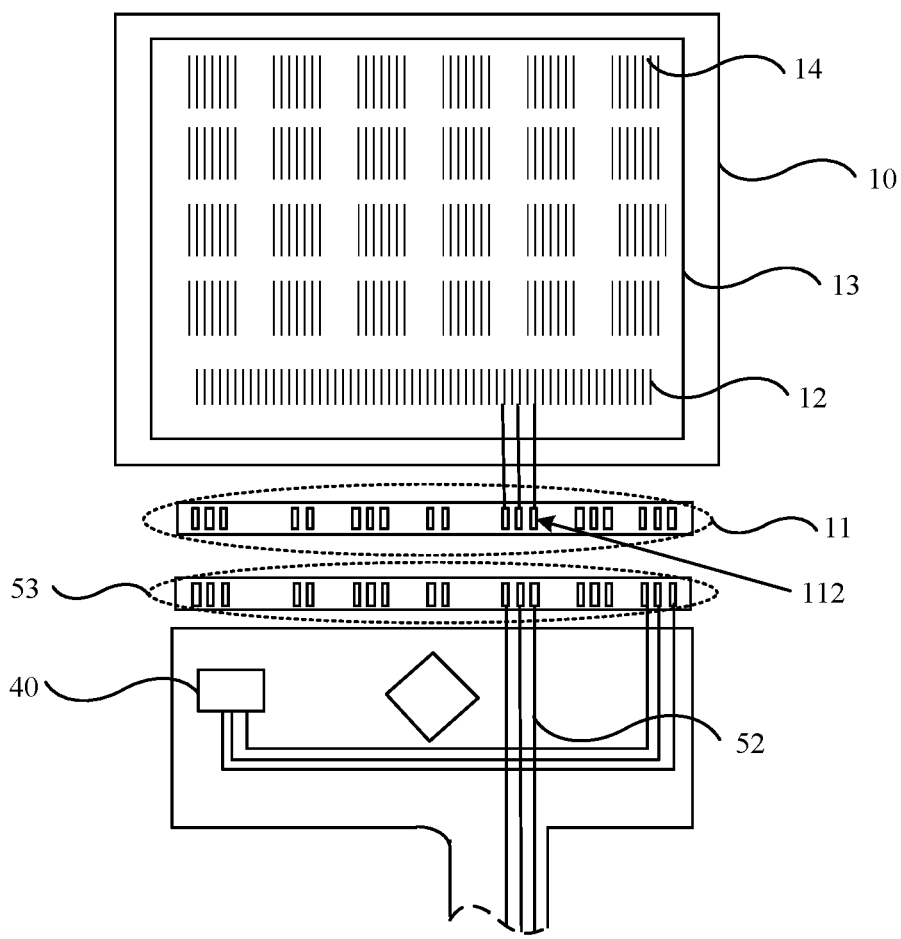
FIG. 17 is a structural diagram of a touch display device, in accordance with yet other embodiments.

For example, in some embodiments of the present disclosure, as shown in FIG. 16, the display driving circuit 12 may be a display driving chip (also referred to as display driver IC, DDIC), and in this case, the DDIC is electrically connected to the eighth welding pads 112. For another example, in some other embodiments of the present disclosure, as shown in FIG. 17, the display screen 10 in the touch display module 200 may include a base substrate 13 and the pixel driving circuits 14 disposed on the base substrate 13. The display driving circuit 12 is integrated on the base substrate 13. In a process of manufacturing thin film transistors (TFTs) of the pixel driving circuits 14, TFTs in the display driving circuit 12 are manufactured synchronously, so that the display driving circuit 12 may be integrated on the base substrate 13. The above process of integrating the display driving circuit 12 on the base substrate 13 may simplify the process, reduce the costs, and realize a narrow bezel of the touch display device 100.

When the display driving circuit 12 is either of the above forms, the display driving circuit 12 may process the display data signals on the data wirings 52 and output the processed display signals to the pixel driving circuits 14 in the display screen 10, so as to realize the image display of the touch display device 100.

Figure 18:
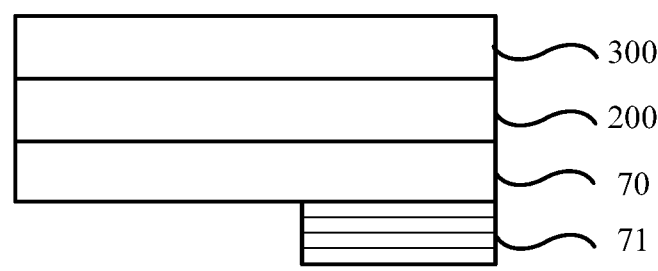
FIG. 18 is a sectional view of a touch display device, in accordance with some other embodiments.
Figure 19:
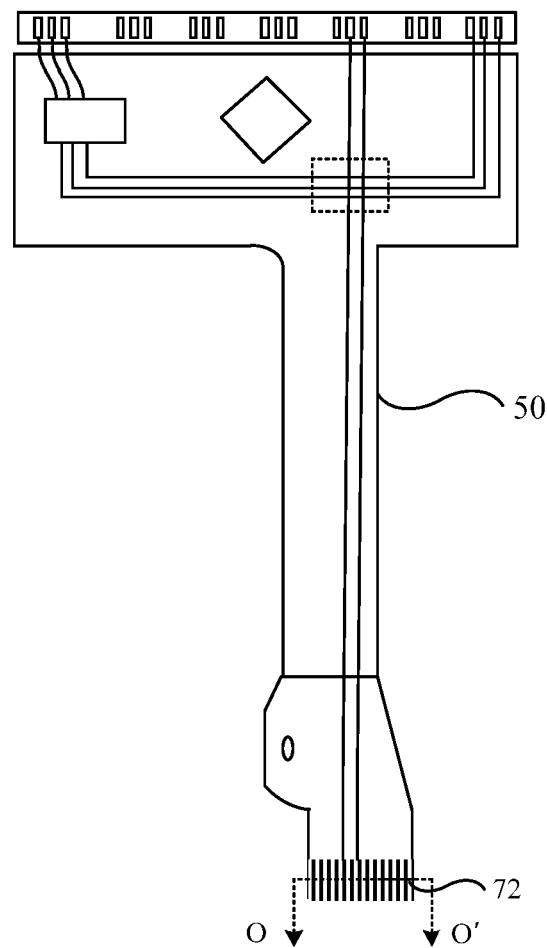
FIG. 19 is a structural diagram of a touch display device, in accordance with yet other embodiments.

In order to provide the display data signals, as shown in FIG. 18, the touch display device 100 may further include the control mainboard 70. The control mainboard 70 is located on a side (i.e., back) of the touch display module 200 away from the cover plate 300. In order to transmit the display data signals output from the control mainboard 70 to respective data wirings 52, the touch display device 100 may further include a first connector 71 and a second connector 72. The first connector 71 is located on a side of the control mainboard 70 away from the touch display module 200, and is electrically connected to the control mainboard 70. That is, the first connector 71 may be a signal interface of the control mainboard 70. The first connector 71 is also connected to the second connector 72. As shown in FIG. 19, the second connector 72 is located on the flexible printed circuit 50, and is electrically connected to the flexible printed circuit 50.

Figure 20:
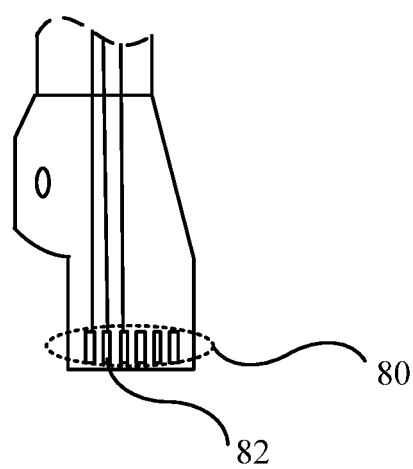
FIG. 20 is a partial structural diagram of a flexible printed circuit, in accordance with yet other embodiments.

In order to realize the electrical connection between the second connector 72 and the flexible printed circuit 50, as shown in FIG. 20, the flexible printed circuit 50 further includes a third bonding portion 80, and the third bonding portion 80 includes a plurality of seventh welding pads 82. The seventh welding pads 82 are connected to the second connector 72 (as shown in FIG. 19).

Figure 21A:
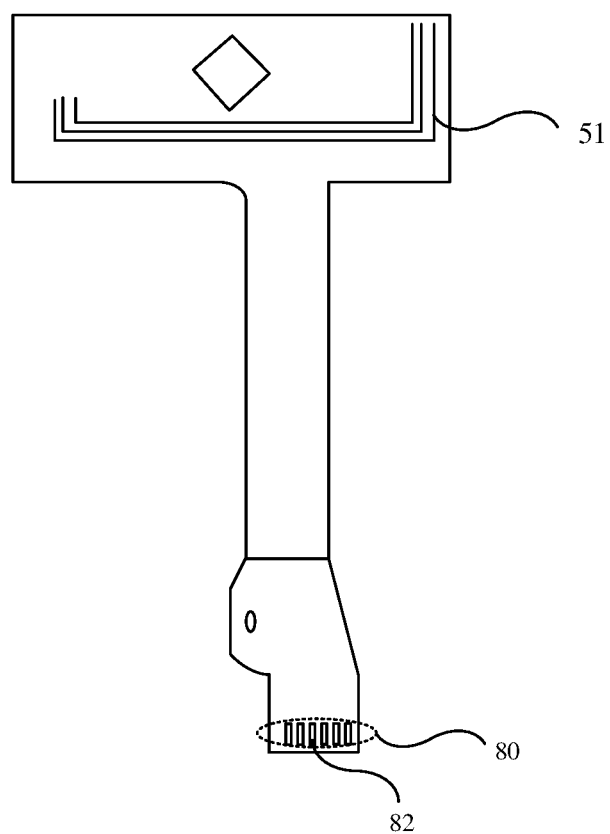
FIG. 21A is a structural diagram of a flexible printed circuit, in accordance with yet other embodiments.

It will be noted that in some embodiments of the present disclosure, as shown in FIG. 21A, the first metal pattern layer 502 further includes the plurality of seventh welding pads 82. The plurality of seventh welding pads 82 and the first touch wirings 51 are arranged in the same layer, and are made of the same material. For example, in order to simplify the process, the plurality of seventh welding pads 82 and the plurality of first touch wirings 51 may be manufactured by a same photolithography process. In addition, the plurality of seventh welding pads 82 and the plurality of first touch wirings 51 are insulated from each other. In this case, in order to output the display data signals provided from the control mainboard 70 to the first bonding portion 11 in the touch display module 200, through holes K2 (not shown in FIG. 21A) are required to be provided in the flexible printed circuit 50. An end of the through hole K2 extends to the data wiring 52, and another end of the through hole K2 extends to the seventh welding pad 82, so that the display data signal provided from the control mainboard 70 may be output to the first bonding portion 11 sequentially through the seventh welding pad 82, the through hole K2 and the data wiring 52. In this way, when the flexible printed circuit 50 is bent to a back of the touch display module 200, the second connector 72 is easily electrically connected to the first connector 71.

Figure 21B:
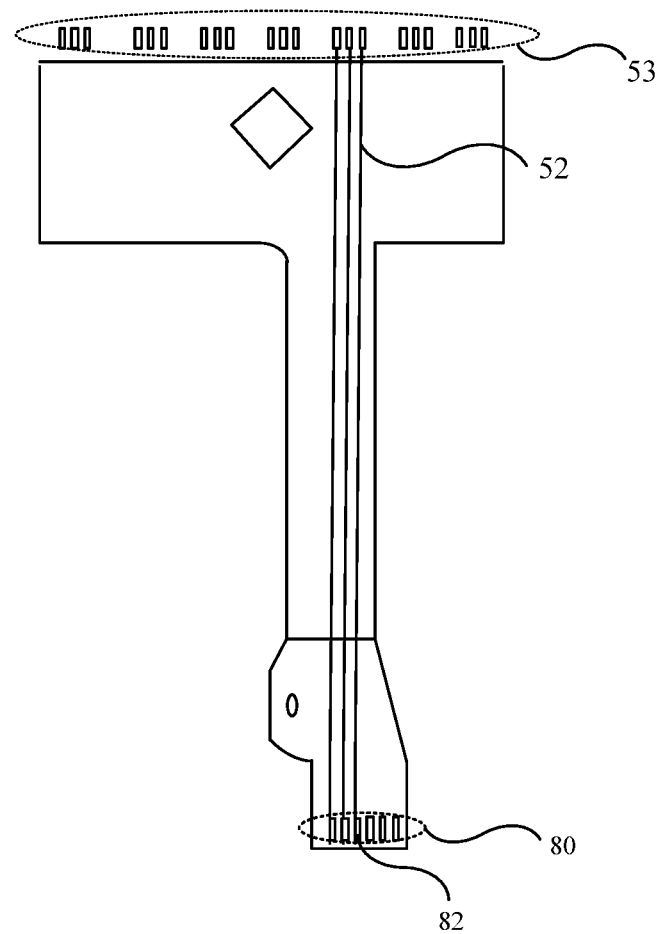
FIG. 21B is a structural diagram of a flexible printed circuit, in accordance with yet other embodiments.

In some other embodiments of the present disclosure, as shown in FIG. 21B, the second metal pattern layer 504 may further include the plurality of seventh welding pads 82. In this case, the plurality of seventh welding pads 82 and the plurality of data wirings 52 are arranged in the same layer, and are made of the same material. For example, in order to simplify the process, the plurality of seventh welding pads 82 and the plurality of data wirings 52 may be manufactured by a same photolithography process. In this way, the data wiring 52 may be directly electrically connected to the seventh welding pad 82 without the need of providing a through hole, thereby further simplifying the process and reducing the costs.

Figure 22:
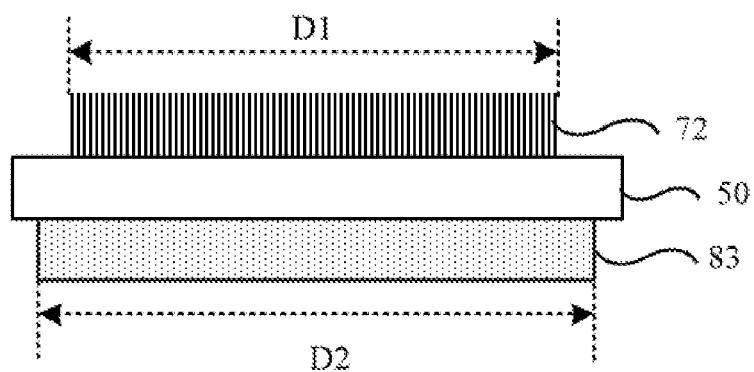
FIG. 22 is a sectional view of the touch display device shown in FIG. 19 taken along the O-O' direction.

On this basis, in some embodiments of the present disclosure, as shown in FIG. 22 (FIG. 22 is a sectional view taken along the O-O' direction in FIG. 19), the touch display device 100 further includes a second support pad 83. The second support pad 83 is located on a side of the flexible printed circuit 50 away from the second connector 72 and is connected to the flexible printed circuit 50. A maximum length D1 of the second connector 72 is less than a maximum length D2 of the second support pad 83. In this way, the second support pad 83 may support the second connector 72 on the flexible printed circuit 50.

On this basis, in a case where the touch display module 200 is electrically connected to the flexible printed circuit 50 through the first bonding portion 11 and the second bonding portion 53, and the control mainboard 70 includes a central processing unit (CPU) or a graphic processing unit (GPU), the central processing unit CPU or the graphic processing unit GPU is electrically connected to the data wirings 52 in the flexible printed circuit 50 through the second connector 72, and the data wirings 52 are electrically connected to the display driving circuit 12 through the second bonding portion 53. The display driving circuit 12 is electrically connected to the pixel driving circuits 14 through respective data lines. In this way, display data provided from the central processing unit CPU or the graphic processing unit GPU may be transmitted to the display driving circuit 12 through the data wirings 52, so that the display data is provided to the pixel driving circuits 14 by using the display driving circuit 12, thereby realizing the display function of the touch display device 100.

In summary, the data wirings 52 are used for transmitting the display data signals in the control mainboard 70 to the display driving circuit 12, and thus the display data signals are transmitted to the pixel driving circuits 14 through the data lines, thereby realizing the image display of the touch display device. The first touch wirings 51 transmit the touch detection signals to the touch chip 40, and output the touch drive signals, thereby realizing the touch function of the touch display device. In this way, the touch function and the display function of the touch display device 100 are realized.

Example 2, in this example, a mutual capacitive touch technology may be used in the touch display device 100. The stacking structures and the manufacturing methods of the flexible printed circuit 50, and the structural design of the display driving circuit described above are all applicable to this example.

Figure 23A:
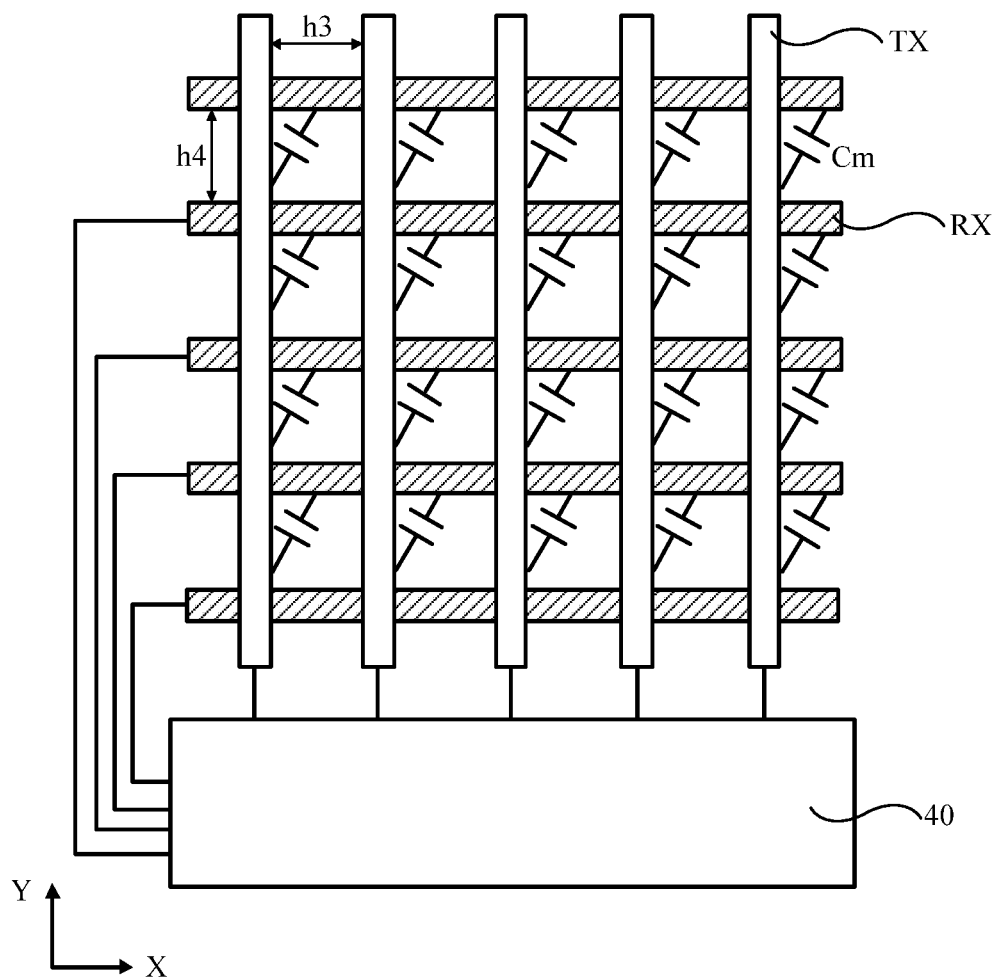
FIG. 23A is a structural diagram of a touch panel, in accordance with some other embodiments.

A difference between this example and Example 1 is that the touch panel 20 may include a plurality of first touch electrodes (e.g., sending electrodes TX) and a plurality of second touch electrodes (e.g., receiving electrodes RX) as shown in FIG. 23A. The plurality of sending electrodes TX and the plurality of receiving electrodes RX cross, and are insulated from each other. In addition, each of the plurality of sending electrodes TX may extend along the first direction Y, and the plurality of sending electrodes TX may be arranged side by side along the second direction X at a certain preset spacing distance h3. Each of the plurality of receiving electrodes RX may extend along the second direction X, and the plurality of receiving electrodes RX may be arranged side by side along the first direction Y at a certain preset spacing distance h4. Therefore, the plurality of sending electrodes TX and the plurality of receiving electrodes RX may cross.

In addition, in the embodiments of the present disclosure, the sending electrodes TX and the receiving electrodes RX may be formed by using two different conductive layers, or may be formed by using a same conductive layer. In a case where the sending electrodes TX and the receiving electrodes RX are formed by using two different conductive layers, the two conductive layers are insulated by insulating layer(s). The touch chip 40 is electrically connected to each sending electrode TX and each receiving electrode RX, regardless of the manner in which the sending electrodes TX and the receiving electrodes RX are formed.

Hereinafter, for the convenience of description, as an example, the sending electrodes TX and the receiving electrodes RX are formed by using the same conductive layer.

Figure 23B:
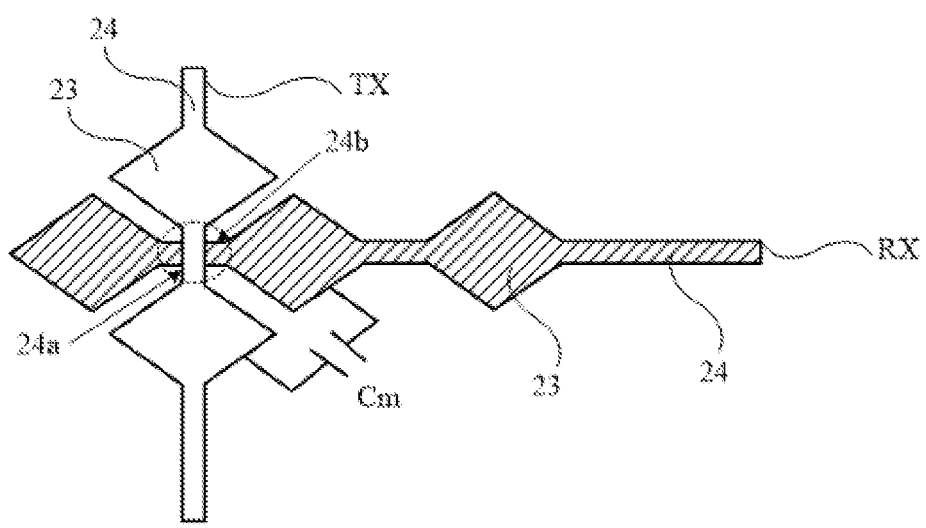
FIG. 23B is an equivalent circuit diagram of the touch panel shown in FIG. 23A.

In this case, as shown in FIG. 23B, any one of the sending electrode TX and the receiving electrode RX may include a plurality of block electrodes 23 and strip electrodes 24 connected to the plurality of block electrodes 23. Block electrodes 23 of the plurality of sending electrodes TX and the plurality of receiving electrodes RX may be arranged in a same layer. The strip electrodes 24 of the sending electrode TX and the receiving electrode RX cross. At the broken line in FIG. 23B, the strip electrode 24a of the sending electrode TX and the strip electrode 24b of the receiving electrode RX are arranged in different layers, and insulating layer(s) are provided in an overlapping area of the strip electrode 24a and the strip electrode 24b. In this case, as shown in FIG. 23B, any group of a sending electrode TX and a receiving electrode RX that transversely and longitudinally cross have the parasitic capacitor Cm at a crossing position.

In a process of scanning the sending electrodes TX, the touch chip 40 may detect a touch detection signal from the receiving electrode RX, so as to determine discharging time of the parasitic capacitor Cm and obtain a capacitance value of the parasitic capacitor Cm.

Figure 23C:
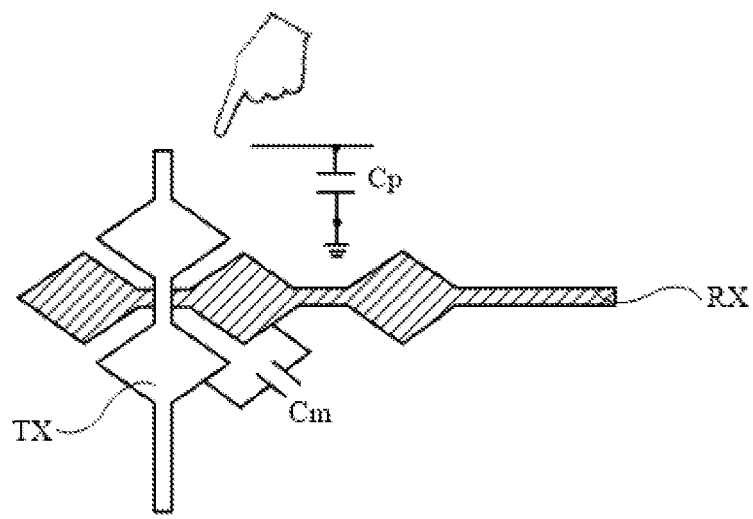
FIG. 23C is another equivalent circuit diagram of the touch panel shown in FIG. 23A.

Similarly, when the finger is not close to the sending electrode TX and the receiving electrode RX, the capacitance value of the parasitic capacitor Cm is a constant. When the finger is close to the sending electrode TX and the receiving electrode RX, it can be seen from the above that the finger may be equivalent to the reference ground (e.g., 0 V), and an equivalent capacitor Cp is formed between the finger and the sending electrode TX. Therefore, as shown in FIG. 23C, the equivalent capacitor Cp is equivalent to be connected in parallel with two ends of the parasitic capacitor Cm. In this way, when the touch chip 40 detects a change in the capacitance value, a finger touch is determined, so as to achieve the purpose of touch detection.

Figure 24:
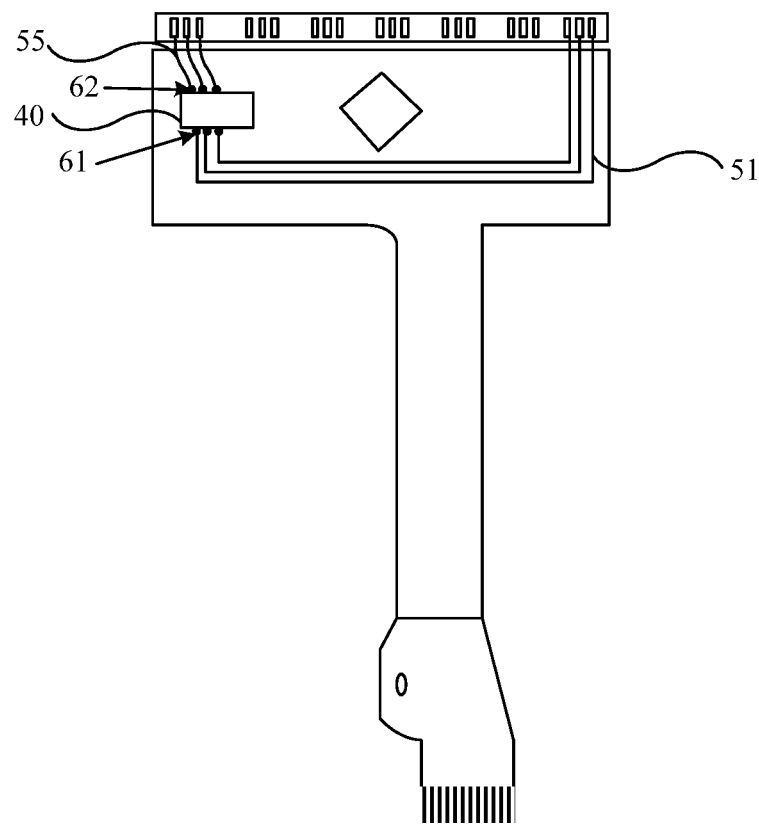
FIG. 24 is a structural diagram of a touch display device, in accordance with yet other embodiments.

In some embodiments of the present disclosure, in order to electrically connect the plurality of sending electrodes TX and the plurality of receiving electrodes RX to the touch chip 40, as shown in FIG. 24, the first metal pattern layer 502 in the flexible printed circuit 50 may include a plurality of first touch wirings 51 and a plurality of second touch wirings 55. The first touch wirings 51 and the second touch wirings 55 are insulated from each other. The plurality of first touch wirings 51 are respectively electrically connected to the plurality of sending electrodes TX, and the plurality of the second touch wirings 55 are respectively electrically connected to the plurality of receiving electrodes RX.

In addition, the first metal pattern layer 502 may further include first pads 61 and second pads 62. The first pads 61 are respectively electrically connected to the first touch wirings 51, and are electrically connected to the touch chip 40. The second pads 62 are respectively electrically connected to the second touch wirings 55, and are electrically connected to the touch chip 40.

In this way, the first touch wiring 51 electrically connects the touch chip 40 to the sending electrode TX, and the second touch wiring 55 electrically connects the touch chip 40 to the receiving electrode RX.

It will be noted that the first touch electrode may be the TX, and the second touch electrode may be the RX. For example, in a case where the first touch electrode is the sending electrode TX and the second touch electrode is the RX, the touch chip 40 sends a touch drive signal to the first touch wiring 51, and receives the touch detection signal from the second touch wiring 55. Alternatively, in a case where the first touch electrode is the RX and the second touch electrode is the TX, the touch chip 40 sends a touch drive signal to the second touch wiring 55, and receives a touch detection signal from the first touch wiring 51.

Figure 25:
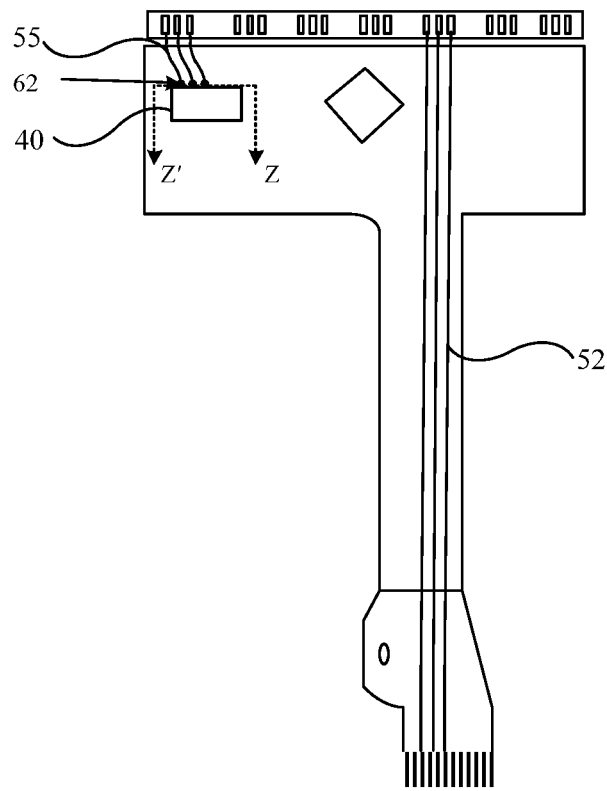
FIG. 25 is a structural diagram of a touch display device, in accordance with yet other embodiments.

In some other embodiments of the present disclosure, as shown in FIG. 25, the plurality of second touch wirings 55 may be arranged in the second metal pattern layer 504 (shown in FIG. 11). The data wirings 52 are arranged in the second metal pattern layer 504. In order to prevent the second touch wiring 55 and the data wiring 52 from being short-circuited, the second touch wiring 55 is insulated from the data wiring 52.

Figure 26:
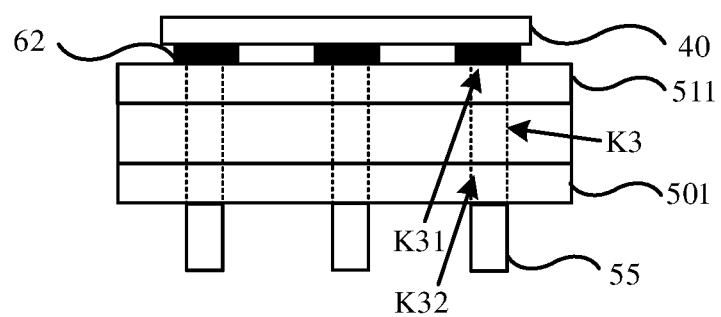
FIG. 26 is a sectional view of the flexible printed circuit shown in FIG. 25 taken along the Z-Z' direction.

On this basis, in order to realize the electrical connection between the touch chip 40 and the second touch wirings 55, the flexible printed circuit 50 further includes a plurality of through holes K3 (as shown in FIG. 26, FIG. 26 is a sectional view taken along the Z-Z' direction in FIG. 25). A first end (i.e., upper end) K31 of the through hole K3 extends to the second pad 62, and the second pad 62 is electrically connected to the touch chip 40. A second end (i.e., lower end) K32 of the through hole K3 extends to the second touch wiring 55.

It will be noted that each through hole K3 has metal therein. An end of the metal in the through hole K3 may be electrically connected to the touch chip 40, and another end of the metal may be electrically connected to the second touch wiring 55. In order to simplify the figure, only the first flexible substrate 501 and the second flexible substrate 511 are shown in the sectional view of FIG. 26, and other film layers are omitted. Specific other film layers may refer to FIG. 12.

Hereinafter, a touch process of the touch display device 100 in which the mutual capacitive touch technology is used will be described in detail in an example where the first touch wirings 51 and the second touch wirings 55 are located in the first metal pattern layer 502.

Figure 27:
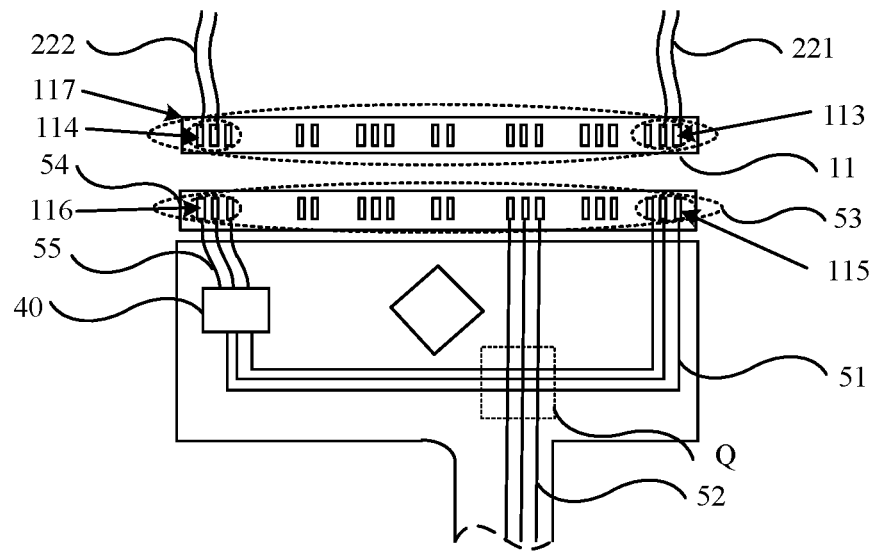
FIG. 27 is a structural diagram of a touch display device, in accordance with yet other embodiments.

In a case where the mutual capacitive touch technology is used in the touch display device 100, in some embodiments of the present disclosure, as shown in FIG. 27, the first bonding portion 11 in the touch display module 200 includes a plurality of third welding pads 113 and a plurality of fourth welding pads 114. The touch panel 20 includes a plurality of first electrode leads 221 and second electrode leads 222. The first electrode leads 221 are respectively electrically connected to the third welding pads 113, and are respectively electrically connected to the sending electrodes TX (as shown in FIG. 23A). The second electrode leads 222 are respectively electrically connected to the fourth welding pads 114, and are respectively electrically connected to the receiving electrodes RX (as shown in FIG. 23A).

As shown in FIG. 27, the second bonding portion 53 in the flexible printed circuit 50 includes a plurality of fifth welding pads 115 and a plurality of sixth welding pads 116. The plurality of fifth welding pads 115 are respectively electrically connected to the plurality of third welding pads 113, and are respectively electrically connected to the first touch wirings 51. The sixth welding pads 116 are respectively electrically connected to the fourth welding pads 114, and are respectively electrically connected to the second touch wirings 55.

It will be noted that the way of electrically connecting the fifth welding pad 115 to the third welding pad 113 and electrically connecting the sixth welding pad 116 to the fourth welding pad 114 is similar to the above way of connecting the first welding pad 111 to the second welding pad 531 in Example 1, both of which are realized by adhering the first ACF adhesive 117 to the second ACF adhesive 54, which will not be repeated here.

In summary, in the case where the mutual capacitive touch technology is used in the touch display device 100, the sending electrodes TX in the touch panel 20 are respectively electrically connected to the third welding pads 113 of the first bonding portion 11 in the touch display module 20 through respective first electrode leads 221, and the third welding pads 113 are respectively electrically connected to the fifth welding pads 115 of the second bonding portion 53 in the flexible printed circuit 50. Moreover, the receiving electrodes RX in the touch panel 20 are respectively electrically connected to the fourth welding pads 114 of the first bonding portion 11 in the touch display module 20 through respective second electrode leads 222, and the fourth welding pads 114 are respectively electrically connected to the sixth welding pads 116 of the second bonding portion 53 in the flexible printed circuit 50.

In this way, in a case where the touch display module 200 is electrically connected to the flexible printed circuit 50 through the first bonding portion 11 and the second bonding portion 53, the touch chip 40 may be electrically connected to the sending electrodes TX through the first touch wirings 51 and the first electrode leads 221 in the touch panel 20, so as to send the touch drive signal to the sending electrode TX. Moreover, the touch chip 40 may be electrically connected to the receiving electrodes RX through the second touch wirings 55 and the second electrode leads 222 in the touch panel 20, so as to receive the touch detection signal from the second touch wiring 55.

Similarly, since the first touch wirings 51 and the second touch wirings 55 are located in the first metal pattern layer 502, and the data wirings 52 are located in the second metal pattern layer 504, part of the first touch wirings 51 and the second touch wirings 55 and the data wirings 52 have an overlapping area Q between the two metal layers. The metal shielding layer 503 is disposed in the overlapping area Q (as shown in FIG. 10), so that the interference between the touch detection signal or the touch drive signal on each of the first touch wiring 51 and the second touch wiring 55 and the display data signal on the data wiring 52 in the overlapping area Q may be effectively avoided. Moreover, the structure with three layers (i.e., the first metal pattern layer 502, the metal shielding layer 503 and the second metal pattern layer 504) is used in the flexible printed circuit 50, so that the manufacturing costs of the flexible printed circuit 50 may be significantly reduced, and a larger space may be reserved for the battery cabin during the assembly of the entire device.

Figure 28:
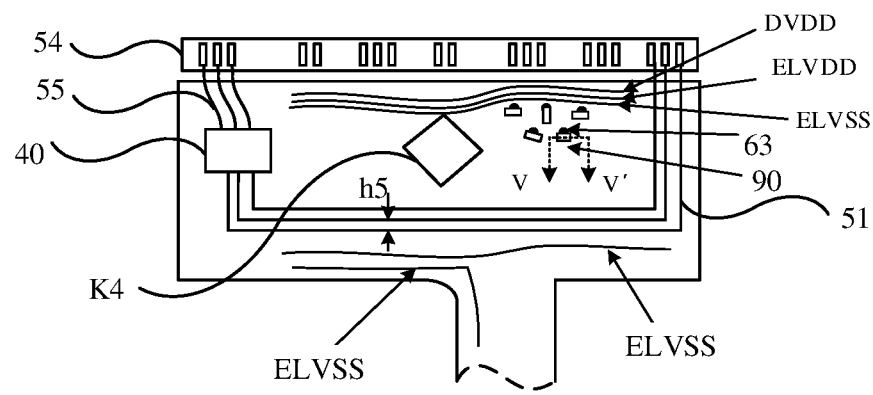
FIG. 28 is a structural diagram of a touch display device, in accordance with yet other embodiments.

Corresponding to any one of the above embodiments, as shown in FIG. 28, the flexible printed circuit 50 further includes display signal lines such as ELVDD, ELVSS, and DVDD for transmitting display signals.

It will be noted that a material and a line width of the display signal line such as ELVDD, ELVSS or DVDD are not specifically limited.

In order to prevent the wirings from being short-circuited, which causes mutual interference between the signals, in some embodiments of the present disclosure, a distance h5 between wirings in a same layer is greater than or equal to 0.05 mm.

On this basis, as shown in FIG. 28, the touch display device 100 further includes a plurality of electronic components 90. The electronic component 90 may be a resistor or a capacitor. In order arrange the electronic components 90 on the flexible printed circuit 50, the first metal pattern layer 502 in the flexible printed circuit 50 further includes a plurality of third pads 63. The third pads 63 are respectively electrically connected to the electronic components 90.

Figure 29:
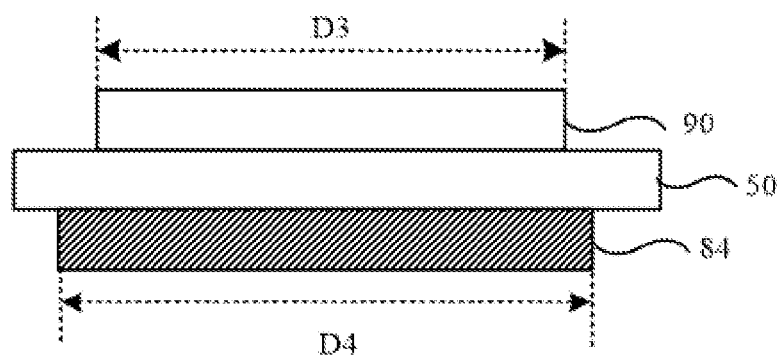
FIG. 29 is a sectional view of the touch display device shown in FIG. 28 taken along the V-V' direction.

In some embodiments of the present disclosure, the touch display device 100 further includes first support pad(s) 84. As shown in FIG. 29 (FIG. 29 is a sectional view taken along the V-V direction in FIG. 28), the first support pad 84 is disposed on a side of the flexible printed circuit 50 away from the electronic component 90, and is connected to the third dielectric layer 507 in the flexible printed circuit 50. A maximum length D3 of the electronic component 90 is less than a maximum length D4 of the first support pad 84, so that the first support pad 84 may support the electronic component 90.

It will be noted that in the embodiments of the present disclosure, a plurality of first support pads 84 may be arranged for respectively supporting the plurality of electronic components 90. Alternatively, an entire first support pad 84 may be arranged. In this case, a maximum length of the first support pad 84 is required to be larger than a maximum length of a total area in which the plurality of electronic components 90 are placed, thereby supporting the plurality of electronic components 90 through the entire first support pad 84.

In some embodiments of the present disclosure, the touch display device 100 further includes a fingerprint recognition element, and the fingerprint recognition element is disposed on the control mainboard 70. The flexible printed circuit 50 is provided with a mounting hole K4 (as shown in FIG. 28) penetrating the flexible printed circuit 50. When at least a part of the flexible printed circuit 50 is bent to the back of the touch display module 200, the fingerprint recognition element may pass through the mounting hole K4 in the flexible printed circuit 50, thereby adding a fingerprint recognition function to the touch display device 100.

Figure 30:
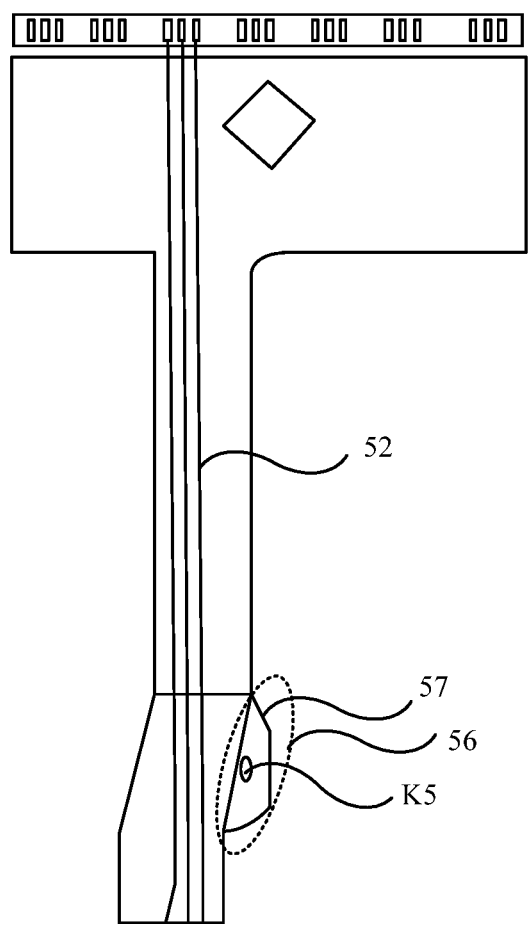
FIG. 30 is a structural diagram of a flexible printed circuit, in accordance with yet other embodiments.

In order to perform an antistatic treatment on the flexible printed circuit 50, in some embodiments of the present disclosure, as shown in FIG. 30, the flexible printed circuit 50 further includes an antistatic portion 56. The antistatic portion 56 includes a metal substrate 57, and a connection hole K5 is provided in the metal substrate 57. The flexible printed circuit 50 is grounded by using the connection hole K5. The metal substrate 57 and the second metal pattern layer 504 may be arranged in the same layer, and are made of the same material. For example, in order to simplify the process, the metal substrate 57 and the second metal pattern layer 504 may be manufactured by using a same photolithography process. Moreover, in order to prevent the metal substrate 57 and the data wiring 52 located in the second metal pattern layer 504 from being short-circuited, the metal substrate 57 is insulated from the data wirings 52. In this way, the antistatic portion 56 is arranged, so that the flexible printed circuit 50 may be prevented from being interfered by static electricity.

The foregoing descriptions are only specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch display device, comprising:
   a touch display module including a display screen and a touch panel; wherein a display driving circuit is disposed on the display screen, and a plurality of electrode leads are disposed in a peripheral area of the touch panel;
   a flexible printed circuit electrically connected to the touch display module; and
   a touch chip disposed on the flexible printed circuit;
   wherein the flexible printed circuit has a body area and a connection area located on a side of the body area; the flexible printed circuit includes:
      a first flexible substrate including a first surface and a second surface arranged opposite to each other;
      a first metal pattern layer located on a side of the first flexible substrate where the first surface is located; wherein the first metal pattern layer includes a plurality of first touch wirings electrically connected to the touch chip;
      a second metal pattern layer located on the second surface of the first flexible substrate; wherein the second metal pattern layer includes a plurality of data wirings electrically connected to the display driving circuit; and
      a metal shielding layer located on the first surface of the first flexible substrate and located between the first flexible substrate and the first metal pattern layer; wherein the metal shielding layer is insulated from the first metal pattern layer; wherein a ratio of a longitudinal length, in a direction from the body area to the connection area, of the metal shielding layer to a longitudinal length, in the direction from the body area to the connection area, of the flexible printed circuit is in a range of 20% to 40%, inclusive;
   wherein the first metal pattern layer and the second metal pattern layer have an overlapping area therebetween in a direction from the second surface to the first surface; the metal shielding layer is located at least in the overlapping area.

2. The touch display device according to claim 1, wherein the touch display module includes a plurality of self-capacitance electrodes spaced apart from each other; the plurality of self-capacitance electrodes are respectively electrically connected to the plurality of first touch wirings; and
   the first metal pattern layer further includes a plurality of first pads; the plurality of first pads are respectively electrically connected to the plurality of first touch wirings, and are electrically connected to the touch chip; the touch chip is used for sending touch drive signals to respective first touch wirings, and for receiving touch detection signals from respective first touch wirings.

3. The touch display device according to claim 2, wherein the touch display module further includes a first bonding portion, and the first bonding portion includes a plurality of first welding pads; the plurality of electrode leads are respectively electrically connected to the plurality of first welding pads, and are respectively electrically connected to the plurality of self-capacitance electrodes; and the flexible printed circuit includes a second bonding portion, and the second bonding portion includes a plurality of second welding pads; the plurality of second welding pads are respectively electrically connected to the plurality of first welding pads, and are respectively electrically connected to the plurality of first touch wirings.

4. The touch display device according to claim 3, wherein the second bonding portion and the plurality of data wirings are arranged in a same layer, and are made of a same material.

5. The touch display device according to claim 4, wherein the touch display device further comprises a first anisotropic conductive film (ACF) adhesive and a second ACF adhesive; the first ACF adhesive and the second ACF adhesive are stacked, and are located between the first bonding portion and the second bonding portion; and the first ACF adhesive is adhered to the first bonding portion, the second ACF is adhered to the second bonding portion, and the first ACF adhesive is adhered to the second ACF adhesive.

6. The touch display device according to claim 3, wherein the first bonding portion further includes a plurality of eighth welding pads; wherein the display driving circuit is a display driving chip, and the display driving chip is electrically connected to the plurality of eighth welding pads;

or the display screen includes a base substrate and pixel driving circuits disposed on the base substrate; the display driving circuit is integrated on the base substrate, and is electrically connected to the pixel driving circuits and the plurality of eighth welding pads.

7. The touch display device according to claim 1, wherein the touch panel includes first touch electrodes and second touch electrodes that transversely and longitudinally cross and are insulated from each other;

the first metal pattern layer further includes second touch wirings insulated from the plurality of first touch wirings; the first touch electrodes are respectively electrically connected to the plurality of first touch wirings, and the second touch electrodes are respectively electrically connected to the second touch wirings;

the first metal pattern layer further includes a plurality of first pads and a plurality of second pads; the plurality of first pads are respectively electrically connected to the plurality of first touch wirings, and are electrically connected to the touch chip; the plurality of second pads are respectively electrically connected to the second touch wirings, and are electrically connected to the touch chip; and the touch chip is used for sending touch drive signals to respective first touch wirings, and for receiving touch detection signals from respective second touch wirings; or the touch chip is used for sending touch drive signals to respective second touch wirings, and for receiving touch detection signals from respective first touch wirings.

8. The touch display device according to claim 7, wherein the touch display module includes a first bonding portion, and the first bonding portion includes a plurality of third welding pads and a plurality of fourth welding pads; the plurality of electrode leads include a plurality of first electrode leads and a plurality of second electrode leads; the plurality of first electrode leads are respectively electrically connected to the plurality of third welding pads, and are respectively electrically connected to the first touch electrodes; the plurality of second electrode leads are respectively electrically connected to the plurality of fourth welding pads, and are respectively electrically connected to the second touch electrodes; and the flexible printed circuit includes a second bonding portion, and the second bonding portion includes a plurality of fifth welding pads and sixth welding pads; the plurality of fifth welding pads are respectively electrically connected to the plurality of third welding pads, and are respectively electrically connected to the plurality of first touch wirings; the sixth welding pads are respectively electrically connected to the plurality of fourth welding pads, and are respectively electrically connected to the second touch wirings.

9. The touch display device according to claim 1, wherein the touch panel includes first touch electrodes and second touch electrodes that transversely and longitudinally cross and are insulated from each other;

the second metal pattern layer further includes second touch wirings insulated from the plurality of data wirings; the first touch electrodes are respectively electrically connected to the plurality of first touch wirings, and the second touch electrodes are respectively electrically connected to the second touch wirings;

the first metal pattern layer further includes a plurality of first pads and a plurality of second pads; the flexible printed circuit further includes a plurality of through holes; the plurality of first pads are respectively electrically connected to the plurality of first touch wirings, and are electrically connected to the touch chip; first ends of the plurality of through holes respectively extend to the plurality of second pads, and the plurality of second pads are electrically connected to the touch chip; and second ends of the plurality of through holes respectively extend to the second touch wirings; and the touch chip is used for sending touch drive signals to respective first touch wirings, and for receiving touch detection signals from respective second touch wirings; or the touch chip is used for sending touch drive signals to respective second touch wirings, and for receiving touch detection signals from respective first touch wirings.

10. The touch display device according to claim 1, wherein the touch display device further comprises a first connector, a second connector and a control mainboard; the first connector is electrically connected to the control mainboard and the second connector; and the flexible printed circuit further includes a third bonding portion, and the third bonding portion includes a plurality of seventh welding pads; the plurality of seventh welding pads are electrically connected to the second connector.

11. The touch display device according to claim 10, wherein the plurality of seventh welding pads and the plurality of first touch wirings are arranged in a same layer, and are made of a same material or the plurality of seventh welding pads and the plurality of data wirings are arranged in a same layer, and are made of a same material.

12. The touch display device according to claim 10, wherein the touch display device further comprises a second support pad connected to a side of the flexible printed circuit away from the second connector; and a vertical projection of the second connector on the first flexible substrate is located within a vertical projection of the second support pad on the first flexible substrate; the second support pad is used for supporting the second connector.

13. The touch display device according to claim 10, wherein the touch display device comprises a fingerprint recognition element disposed on the control mainboard; and
the flexible printed circuit is provided with a mounting hole penetrating the flexible printed circuit; the mounting hole is used for accommodating the fingerprint recognition element when part of the flexible printed circuit is bent to a back of the touch display module.

14. The touch display device according to claim 1, wherein the flexible printed circuit further includes:
a first dielectric layer covering a surface of the first metal pattern layer away from the first flexible substrate;
a second dielectric layer located between the first metal pattern layer and the metal shielding layer; and
a third dielectric layer covering a surface of the second metal pattern layer away from the first flexible substrate.

15. The touch display device according to claim 14, wherein the flexible printed circuit further includes:
a first electromagnetic shielding layer covering a surface of the first dielectric layer away from the first flexible substrate; and
a second electromagnetic shielding layer covering a surface of the third dielectric layer away from the first flexible substrate.

16. The touch display device according to claim 1, wherein the flexible printed circuit further includes:
a first dielectric layer covering a surface of the first metal pattern layer away from the first flexible substrate;
a second flexible substrate located between the first metal pattern layer and the metal shielding layer and in contact with the first metal pattern layer;
an adhesive layer located between the second flexible substrate and the metal shielding layer and in contact with the second flexible substrate and the metal shielding layer; and
a third dielectric layer covering a surface of the second metal pattern layer away from the first flexible substrate.

17. The touch display device according to claim 16, wherein the touch display device further comprises electronic components, and the electronic components include at least a capacitor and a resistor;
the first metal pattern layer further includes third pads respectively electrically connected to the electronic components; and
the touch display device further comprises a first support pad connected to the third dielectric layer; a vertical projection of an electronic component in the electronic components on the first flexible substrate is located within a vertical projection of the first support pad on the first flexible substrate; the first support pad is used for supporting the electronic component.

18. The touch display device according to claim 1, wherein a thickness of the metal shielding layer in the direction from the second surface to the first surface is in a range of 5 μm to 20 μm, inclusive.

19. The touch display device according to claim 1, wherein a distance between wirings in a same layer in the flexible printed circuit is greater than or equal to 0.05 mm.

20. The touch display device according to claim 19, wherein the flexible printed circuit further includes an antistatic portion; the antistatic portion includes a metal substrate, and a connection hole is disposed in the metal substrate; the metal substrate and the second metal pattern layer are arranged in a same layer, and are made of a same material; the metal substrate is insulated from the plurality of data wirings.

* * * * *